(12) United States Patent
Hartman et al.

(10) Patent No.: US 12,235,690 B2
(45) Date of Patent: Feb. 25, 2025

(54) SYSTEM AND METHOD FOR MECHANICAL SUPPORT IN CONFIGURABLE SYSTEMS

(71) Applicant: Dell Products L.P., Round Rock, TX (US)

(72) Inventors: Corey Dean Hartman, Hutto, TX (US); Sanjiv Sinha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 397 days.

(21) Appl. No.: 17/721,141

(22) Filed: Apr. 14, 2022

(65) Prior Publication Data

US 2023/0333609 A1 Oct. 19, 2023

(51) Int. Cl.
*G06F 1/18* (2006.01)

(52) U.S. Cl.
CPC ............. *G06F 1/184* (2013.01); *G06F 1/185* (2013.01); *G06F 1/186* (2013.01); *G06F 1/189* (2013.01)

(58) Field of Classification Search
CPC ................................. G06F 1/185; G06F 1/186
See application file for complete search history.

(56) References Cited

U.S. PATENT DOCUMENTS

| | | | |
|---|---|---|---|
| 8,069,293 | B1 | 11/2011 | Rogan et al. |
| 8,451,623 | B2 * | 5/2013 | Chiu ............. G06F 1/186 361/801 |
| 10,129,135 | B1 | 11/2018 | Viljoen |
| 2005/0089027 | A1 | 4/2005 | Colton |
| 2013/0124879 | A1 | 5/2013 | Zhang et al. |
| 2013/0276047 | A1 | 10/2013 | Chapman et al. |
| 2016/0255740 | A1 | 9/2016 | Ping et al. |
| 2016/0328350 | A1 | 11/2016 | Yang |
| 2017/0290158 | A1 | 10/2017 | Pihlman et al. |
| 2019/0196990 | A1 | 6/2019 | Laughton et al. |
| 2019/0335570 | A1 | 10/2019 | Chen et al. |
| 2022/0030402 | A1 | 1/2022 | Bartholic et al. |
| 2022/0166718 | A1 | 5/2022 | Kamisetty et al. |
| 2022/0321498 | A1 | 10/2022 | DiFerdinando |

* cited by examiner

*Primary Examiner* — James Wu
(74) *Attorney, Agent, or Firm* — Womble Bond Dickinson (US) LLP

(57) ABSTRACT

Methods and systems for managing power distribution and/or mechanical load in data processing systems is provided. The power distribution may be managed using multifunction power buses that may relieve a motherboard of a data processing system from distributing power. The mechanical load may be managed using an adapter plate that may relieve the motherboard of the data processing system from providing for attachment of devices based on the location of the mechanical mounting hardware on the devices. By doing so, motherboards may be standardized and customized for use with various devices.

20 Claims, 28 Drawing Sheets

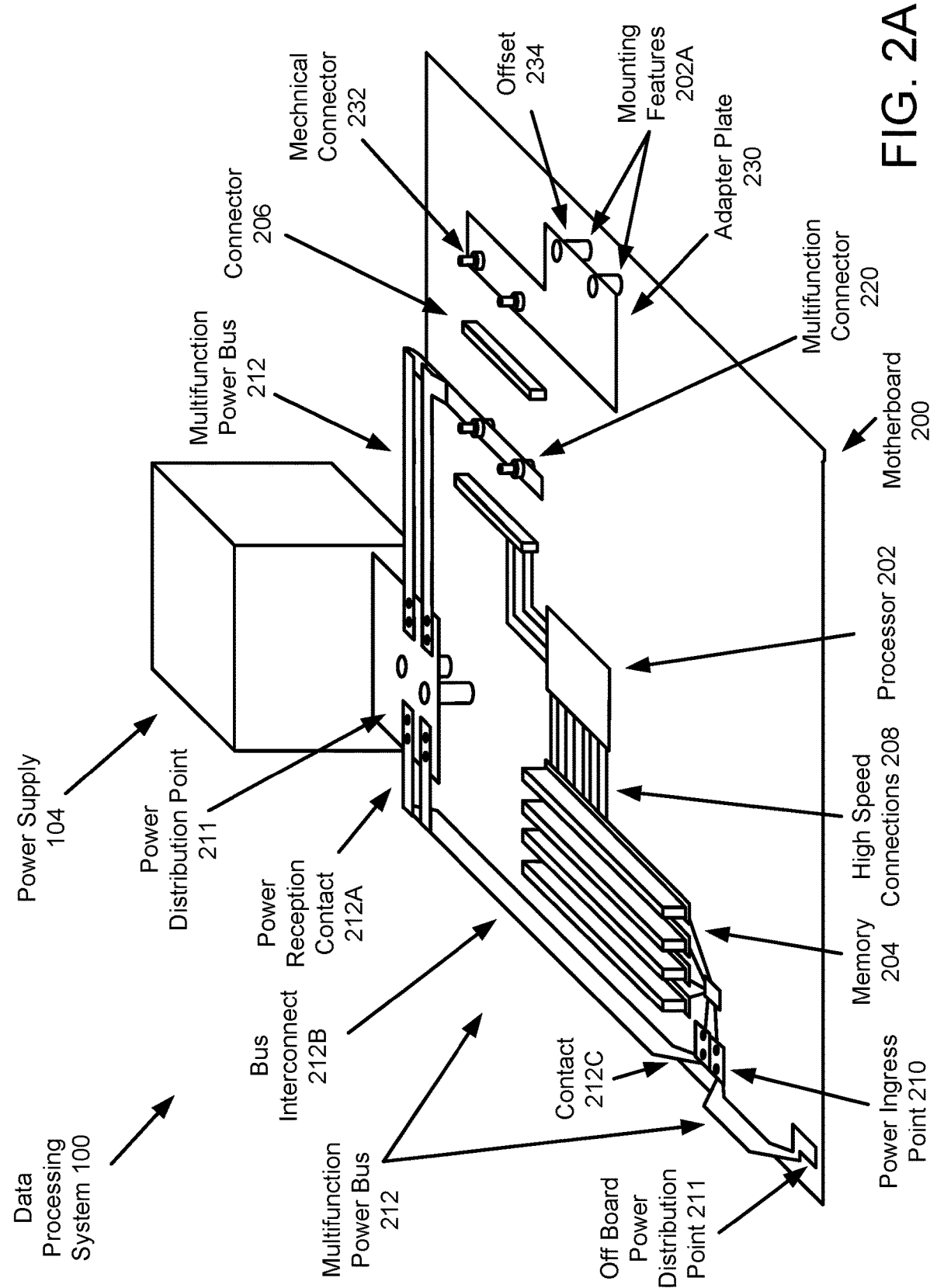

SYSTEM AND METHOD FOR MECHANICAL SUPPORT IN CONFIGURABLE SYSTEMS

FIELD OF THE DISCLOSURE

Embodiments disclosed herein generally relate to data processing systems. More particularly, embodiments disclosed herein relate to systems and methods to manage power distribution and/or mechanical loads in data processing systems.

BACKGROUND

Computing devices may store data and used stored data when performing computations. For example, computing devices may utilize data when providing computer implemented services. To provide the computer implemented services, the computing devices may consume electrical power to perform the computations. The electrical power may be obtained from a variety of sources.

BRIEF DESCRIPTION OF THE DRAWINGS

Embodiments disclosed herein are illustrated by way of example and not limitation in the figures of the accompanying drawings in which like references indicate similar elements.

FIG. 2A shows a diagram illustrating a data processing system in accordance with an embodiment.

DETAILED DESCRIPTION

Figure 1:
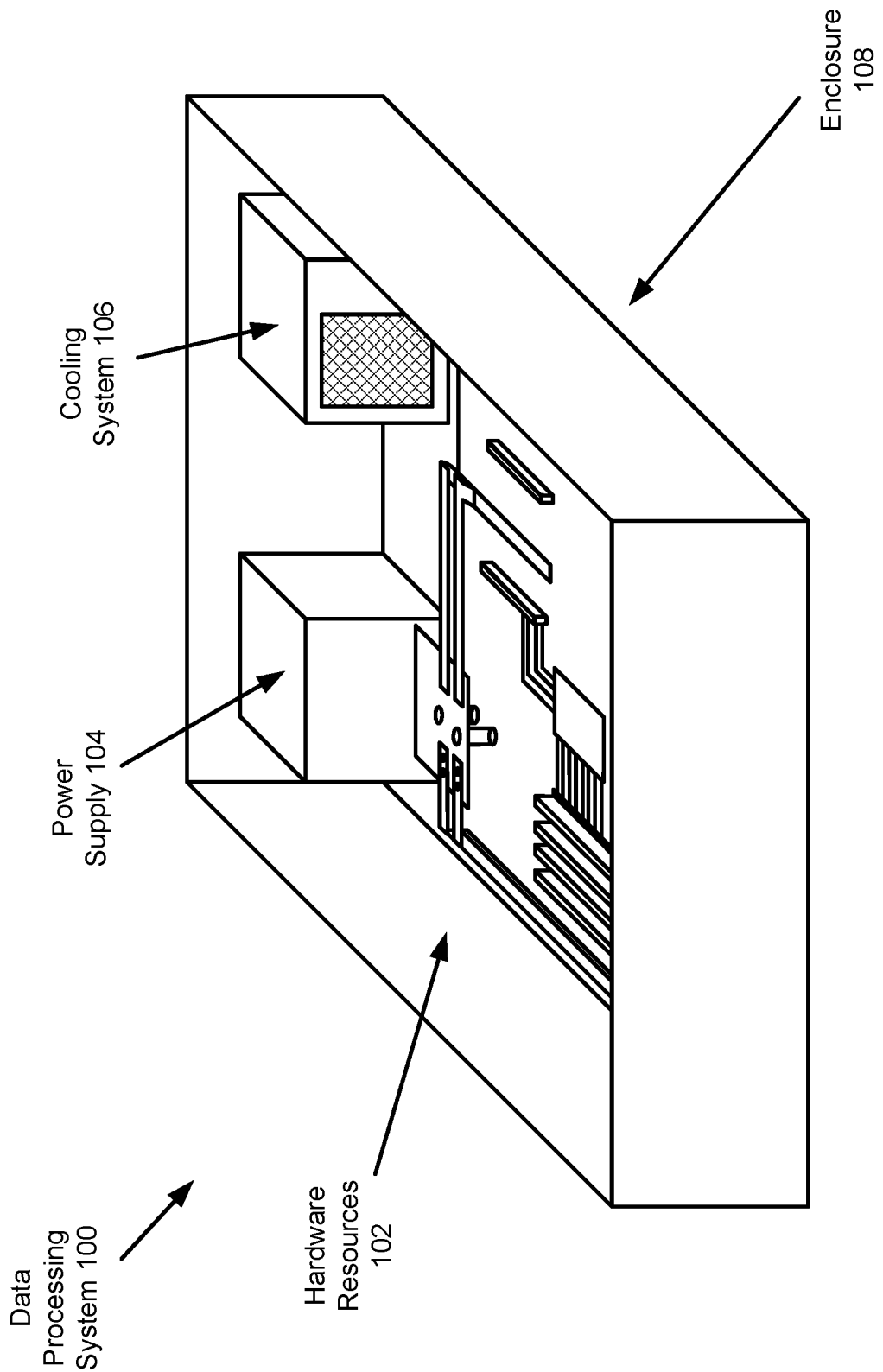
FIG. 1 shows a diagram illustrating a data processing system and enclosure in accordance with an embodiment.

Various embodiments and aspects of the disclosure will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for power distribution and mechanical load management. To provide computer implemented services, a data processing system may include various components that may consume power. When operating, any of these components may need to utilize power and may need to be mechanically stabilized.

To distribute power and manage mechanical loads for these components, adapter plates and multifunction power buses may be utilized. The use of these components may substantially relieve the motherboard from needing to manage power distribution and/or mechanical stabilization. Consequently, the motherboard may face reduced competitive pressure for its area for various functionalities. By doing so, the communications between components may be improved be utilizing areas of the motherboard, that would otherwise be used for power and/or mechanical purposes, for communication purposes.

By doing so, the mechanical stabilization and power distribution responsibilities for various devices of a data processing system may be abstracted away from motherboards and left to adapter plates and/or multifunction power buses.

Additionally, by utilizing multifunction power buses and/or adapter plates, motherboard design may be standardized while still providing for compatibility with a broad array of different devices. Consequently, a new approach for data processing systems may be provided where a standardized motherboard design is implemented and various designs for adapter plates/multifunction power devices are implemented. The motherboard may then be made compatible with varying devices (e.g., riser cards or other devices) that have varying mechanical stabilization requirements.

In an embodiment, a data processing system to provide computer implemented services is provided. The data processing system may include a power supply; a motherboard, including: device locations where devices may be operably connected to the motherboard; data interconnects between device locations that facilitate operable data connection formation between devices in the device locations, and power ingress points positioned with the device locations; a multifunction power bus adapted to distribute power from the power supply to the power ingress points, the multifunction power bus including: contacts adapted to form electrical connections with the power ingress points; a power reception contact adapted to form an electrical connection with the power supply; and a bus interconnect positioned between two of the contacts or one of the contacts and the power reception contact, the bus interconnect being elevated over a surface of the motherboard while the multifunction power bus distributes the power from the power supply.

The data processing may also include a riser card adapted to be positioned in one of the device locations, the riser card may require mechanical support when positioned in the device location. The multifunction power bus may also include a mechanical support adapted to support the riser card while the riser card is positioned in the device location.

The mechanical support may be directly attached to the bus interconnect.

The mechanical support may be adapted to distribute power from the power supply to the riser card, the power being distributed via the bus interconnect.

The riser card may include an electrical connector and a mechanical connector, wherein the electrical connector and mechanical connector are positioned to place the mechanical connector at a first location over a portion of the data interconnects while the riser card is placed in one of the device locations.

The mechanical support may be positioned at a second location over the portion of the data interconnects while the multifunction power bus distributes power from the power supply.

The first location and second location allow the mechanical connector to make a mechanical connection with the mechanical support while the riser card is placed in the one of the device locations and the multifunction power bus distributes power from the power supply.

The multifunction power bus may further include an off-motherboard contact for distributing power to a device that is not positioned in any of the device locations; and a second bus interconnect positioned between one of the contacts and the off-motherboard contact, the second bus interconnect being elevated over the surface of the motherboard while the multifunction power bus distributes the power from the power supply to the device that is not positioned in any of the device locations.

At least one of the contacts of the multifunction power bus may include a connector adapted to connect to a receptacle positioned in one of the power ingress points.

The power reception contact may be adapted to be placed into contact with a terminal of the power supply to receive power from the power supply.

The power ingress points may be separated from one another by the data interconnects.

The motherboard may not include power distribution structures to facilitate power distribution from the power supply to the power ingress points.

In an embodiment, a multifunction power bus, as described above, is provided.

In an embodiment, a method of obtaining a data processing system is obtained. The method may include selecting a motherboard, an adapter plate, and/or a multifunction power bus based on a device, and assembling the data processing system using the selected components.

In an embodiment, a non-transitory computer readable medium storing instructions that, when executed by a processor, cause a method as discussed above to be performed is provided.

In an aspect, a data processing system to provide computer implemented services is provided. The data processing system may include a motherboard, including: device locations where devices may be operably connected to the motherboard, and data interconnects between the device locations that facilitate operable data connection formation between devices in the device locations, and attachment points positioned away from the data interconnects; a device of the devices positioned at one of the device locations, the device requiring mechanical support; an adapter plate including: a first attachment point attached to one of the attachment points of the motherboard via an offset to distance and orient the adapter plate with respect to the motherboard, a second attachment point attached to the device of the devices to provide the required mechanical support.

The second attachment point may be positioned above a portion of the data interconnects.

The device may include an electrical connector directly connected to an electrical receptacle of the motherboard in the one of the device locations, the direct connection forming an operable connection between the device and a second device of the devices, the second device being positioned at a second of the device locations, and the operable connection being supported by the data interconnects.

The data processing system may also include a second adapter plate, including: the first attachment point adapted for attachment to the one of the attachment points via the offset to distance and orient the second adapter plate with respect to the motherboard; and a third attachment point adapted for attachment to a second device of the devices, the third attachment point having a different first relative placement with respect to the first attachment than when compared to a second relative placement of the second attachment point with respect to the first attachment point.

The second relative placement may be based, at least in part, on a location of a connection point of the device to which the adapted plate is connected.

The first relative placement may be based, at least in part, on a location of a connection point of the second device to which the third attachment point is adapted to be connected.

The second adapter plate may also include a fourth attachment point adapted for attachment to the second device, the fourth attachment point having a different third relative placement with respect to the first attachment than when compared to a second relative placement of the second attachment point with respect to the first attachment point.

The adapter plate may also include a third attachment point attached to a third device of the devices, the third device of the devices being positioned at a second device location of the device locations.

The device may include a riser card.

The adapter plate may be adapted to transmit a portion of forces from the device to a portion of the motherboard which is proximate to the one of the attachment points of the motherboard.

In an embodiment, a system to provide computer implemented services is provided. The system may include a first data processing system including: a first motherboard including: a device location, and data interconnects, and attachment points positioned away from the device location and the data interconnects; a first device positioned at the device location of the first motherboard, the first device requiring first mechanical support; a first adapter plate including: a first attachment point attached to the attachment points of the motherboard via an offset to distance and orient the first adapter plate with respect to the first motherboard, a second attachment point attached to the first device to provide the required first mechanical support; a second data processing system including: a second motherboard identical to the first motherboard: a second device positioned at the device location of the second motherboard, the second device requiring second mechanical support; a second adapter plate including: a third attachment point attached to the attachment points of the second motherboard via an offset to distance and orient the second adapter plate with respect to the second motherboard, a fourth attachment point attached to the second device to provide the required second mechanical support.

Turning to FIG. 1, a diagram illustrating a system in accordance with an embodiment is shown. The system shown in FIG. 1 may be used to provide computer implemented services. The system may include, but is not limited to, data processing system 100 and enclosure 108. Each of these components is discussed below.

Data processing system 100 may provide any number and type of computer implemented services. The computer implemented services may include, for example, data storage services, instant messaging services, data processing services, and/or any other type of services that may be provided using a computing device.

To provide the computer implemented services, data processing system 100 may include hardware resources 102. Hardware resources 102 may include any number and type of hardware devices that may contribute computing resources usable to provide the computer implemented services. The hardware devices may include, for example, processors, memory devices, storage devices, communication devices, and/or any other type of hardware device that may contribute computing resources.

To operate, the hardware devices of hardware resources 102 may be operably connected to one another and may be supplied with power consumed by the hardware devices in their operation. To operably connected the hardware devices to one another, hardware resources 102 may include, for example, a motherboard or other type of device for providing inter-device connectivity. The motherboard may allow for any number of devices to operably connected to each other. To do so, the motherboard may include interconnects such as traces (e.g., structured metallization to form conductive paths between two locations on motherboard) that may form sets of conductive paths between hardware devices positioned with the motherboard. For example, the motherboard may include receptacles such sockets, connectors, and/or other structures that allow the hardware devices to be attached to it. When so attached, the interconnects may form sets of electrical paths between these devices positioned with the receptacles.

To attach to the motherboard, all or a portion of the hardware devices may need to be positioned and/or mechanically stabilized with respect to the motherboard. For example, in some scenarios hardware devices may be implemented with structures (e.g., circuit cards) that are unable to support themselves (and/or maintain their positioning) using the receptacles of the motherboard. In such scenarios, additional mechanical support structures may be used to stabilize these hardware devices while they are attached to the receptacles. If these hardware devices are not stabilized, the hardware devices may degrade (e.g., due to deformation), may not form or maintain necessary electrical connections with the receptacles of the motherboard, and/or other undesired outcomes may occur. To position and/or mechanically stabilize the hardware devices, the additional mechanical support structures may be used to transmit forces on the hardware devices (that may negatively impact the hardware devices) to the motherboard, or other structures that are able to absorb these forces without negative outcomes. The additional mechanical support structures may include, for example, offset, bolts, plates, and/or other structures.

However, in some cases the locations where forces are to be transmitted to motherboards from the hardware devices may coincide with locations where it may be desirable to place interconnects. Consequently, it may not be possible to both transmit forces and place interconnects at desirable locations on the motherboard due to space limitations on the motherboard.

Further, due to the wide number of devices that may be attached to any receptacle of a motherboard, a motherboard may not be able to provide the mechanical stabilization required for support of all of the devices that may be attached to the receptacle. For example, consider a riser card for a peripheral such as a peripheral component interconnect express (PCIE) card. The size and structure of PCIE cards and/or riser cards may be highly dependent on each card's function. The mechanical stabilization requirements for these cards may correspondingly vary based on the respective sizes and structures of the cards. Consequently, any single motherboard may not be able to support the mechanical stabilization necessary for all types of such riser cards.

When appropriately attached to the motherboard and stabilized, the hardware devices may consume power during their operation. Consequently, power may need to be provided to the hardware devices. However, like the additional mechanical support structures, providing power to the hardware devices via the motherboard may reduce the area available on the motherboard where the interconnects may be placed. Accordingly, it may not be possible to both power hardware devices with power distributed by a motherboard and place the interconnects at desirable locations on the motherboard due to space limitations.

In general, embodiments disclosed herein may provide systems, devices, and/or methods for distributing power to hardware devices and/or mechanically stabilizing hardware devices. To do so, a system in accordance with one more embodiments may include components (e.g., a multifunction power bus, discussed below) that facilitate power distribution to hardware devices positioned with a motherboard and/or proximate to a motherboard (e.g., such as a hard disk drive operably connected to the hardware devices positioned with the motherboard). In contrast to power distribution via a motherboard, the components that distribute the power may be elevated away from the motherboard and may not compete for motherboard space with interconnects or other structures utilized by a motherboard to facilitate communications between hardware devices. Refer to FIGS. 4A-4F for additional details regarding such components (e.g., multifunction power bus).

The system in accordance with one or more embodiments may also include components (e.g., adapter plates) that facilitate mechanical stabilization of the hardware devices. Like the power distribution components, the mechanical stabilization components may be elevated away from the motherboard and may not compete for motherboard space with interconnects or other structures utilized by the motherboard to facilitate communications between hardware devices. Refer to FIGS. 3A-3F for additional details regarding such components (e.g., adapter plates, standoffs, etc.).

In an embodiment, the power distribution components also provide mechanical stabilization of the hardware devices. When doing so, the power distribution components may distribute power to the stabilized devices directly while also stabilizing them (e.g., the same structure may perform both functions). Refer to FIGS. 5A-5H for additional details regarding such components (e.g., multifunction power bus with standoffs, pins, etc.).

The system in accordance with one or more embodiments may also facilitate standardization in design and manufacturing of data processing systems to facilitate use of hardware devices that have a range of different mechanical stabilization requirements. To do so, motherboards that have a standardized pattern for mounting adapter plates and/or multifunction power buses and a variety of different adapter plates and/or multifunction power buses compatible with the standardized mounting pattern may be obtained. The different adapter plates and/or multifunction power buses may be used to mechanically stabilize different hardware devices having different stabilization requirements using the standardized mounting patterns.

By doing so, embodiments disclosed herein may provide data processing system with improved interconnection speeds and/or bandwidth (e.g., by not being forced to route data interconnects around on-board power buses and/or hardware mounting points for device stabilization, may provide improved system compatibility and reduced cost (e.g., through part standardization), and/or other benefits.

Enclosure 108 may include a physical structure for housing data processing system 100. The physical structure may be a form factor compliant structure such as, for example, a rack mount enclosure for a server. The physical structure may be other types of structures for housing data processing systems without departing from embodiments disclosed herein.

To manage the thermal energy generated by the hardware devices, data processing system 100 may include cooling system 106. Cooling system 106 may, for example, generate and/or manage airflow through the interior of enclosure 108. For example, cooling system 106 may include a fan or other airflow generation components that may generate and/or direct airflow within enclosure 108. The resulting airflow may dissipate the thermal energy generated by the hardware devices.

While the system of FIG. 1 has been illustrated as including a limited number of specific components, a system may include different numbers, types, and/or quantities of components without departing from the embodiments disclosed herein.

To further clarify embodiments disclosed herein, an example diagram of data processing system 100 without and enclosure in accordance with embodiments is shown in FIG. 2A. To provide its functionality, data processing system 100 may include motherboard 200, power supply 104, multifunction power bus 212, and adapter plate 230. Each of these components is discussed below.

To facilitate operable connectivity between various devices, motherboard 200 may include high speed connections 208. High speed connections 208 may be implemented using traces that route electrical signals between various devices. For example, processor 202 and memory 204 may be interconnected via high speed connections 208 of motherboard 200.

High speed connections 208 may operate as interconnections between various receptacles of motherboard 200. These receptacles may allow components such as processor 202 and memory 204 positioned therein to communicate with one another. In FIG. 2A, only a limited number of high speed connections 208 are illustrated. A motherboard may include a larger number of high speed interconnects. The placement and shapes/structures of high speed interconnects may have a significant impact on the ability of devices to communicate with one another. Consequently, dedicating portions of motherboard 200 for other functions over use for high speed connections 208 may negatively impact the ability of components attached to motherboard 200 to communicate with one another.

Motherboard 200 may include a range of different receptacles. For example, the receptacles may include connector 206. Connector 206 may facilitate operable connection of riser cards (or other types of devices) with motherboard 200. Connector 206 may be adapted to operably connect a device to motherboard 200, but may not provide for mechanical stability of the attached device.

To provide mechanical stability of the attached device, forces applied to the device may need to be dissipated (e.g., via transmission to other structures such as motherboard 200). In an embodiment, forces applied to the device are dissipated by physically attaching the device to motherboard 200. For example, motherboard 200 may include holes or other types of mechanical attachment points that allow for devices that mechanically interconnect motherboard 200 and the device to be connected to motherboard 200. By doing so, forced applied to devices attached to connector 206 (and/or other receptacles) may be dissipated thereby maintaining the structural integrity of the attached devices. Motherboard may include sufficient structural integrity to absorb the transmitted forces without negative impact.

In an embodiment, the mechanical attachment points are positioned away from the connectors to which the devices will attached. For example, a standardized patterns of mounting features 202A (e.g., holes or other structures) may be positioned in a standardized pattern and/or away from connector 206. By doing so, the portion of motherboard 200 proximate to connector 206 may be preferentially used for high speed connections 208 rather than for mounting features 202A.

However, by virtue of the distance from connector 206 and/or standardization of the pattern of mounting features 202A, motherboard 200 may not be able to facilitate direct attachment of a wide variety of different types of devices. For example, different types of devices that may attach to connector 206 may include mechanical mounting points of varying topology and which may different in topology from the topology of connector 206 and mounting features 202A.

To facilitate mechanical connection of a device to motherboard 200, adapter plate 230 may be utilized. Adapter plate 230 may be implemented with a structure that allows for interconnection of a device attached to connector 206 to mounting features 202A. For example, adapter plate 230 may be implemented with a plate having a first hole pattern (or other type of structures) corresponding to mounting features 202A and a second hole pattern (or other types of structures) corresponding to the topology of a device to be attached to connector 206. These hole patterns may be separated from one another based on the relative position of connector 206 and mounting features 202A.

Adapter plate 230 may be connected to motherboard 200 with offset 234. Offset 234 may be a mechanical structure that distances adapter plate 230 from motherboard 200. For example, offset 234 may elevate adapter plate 230 from motherboard 200. Multiple offsets may be used to mechanically connect adapter plate 230 to a device connected to connector 206.

To facilitate attachment of a device to adapter plate 230, any number of mechanical connector 232 may be utilized. Mechanical connector 232 may be implemented with a structure that attaches to one of the second hole pattern and a portion of a device attached to connector 206. Multiple mechanical connectors may be used to mechanically connect adapter plate 230 to a device connected to connector 206.

The devices connected to motherboard 200 may consume power while operating.

To provide power to these devices, one or more of multifunction power bus 212 may be utilized. Multifunction power bus 212 may distribute power from power supply 104 to (i) various power ingress points (e.g., 210) of motherboard 200 (which may in turn provide power to connected devices through connectors (e.g., 206)), (ii) to devices connected to motherboard 200 (e.g., thereby avoiding power distribution through motherboard 200 entirely), and/or devices positioned away from motherboard 200 (e.g., such as hard disk drives), but that may be operably connected to motherboard 200. By utilizing multifunction power bus 212, motherboard 200 may generally not need to include (or may include fewer structure dedicated for) functionality for power distribution. By doing so, high speed connections 208 may not compete (or may face reduced competition) for space on motherboard 200 against other structures of motherboard 200 that may otherwise distribute power to devices connected to motherboard 200.

Multifunction power bus 212 may be implemented with a physical structure. The structure may attach to motherboard 200 and have a shape that elevates the majority of multifunction power bus 212 away from motherboard 200. For example, a multifunction power bus may include (i) contacts (e.g., 212C) adapted to form electrical connections with power ingress points (e.g., 210) of motherboard 200, (ii) a power reception contact (e.g., 212A) adapted to form an electrical connection with the power supply (e.g., via power distribution point 211), and a bus interconnect (e.g., 212B) positioned between two of the contacts (e.g., 212C) or one of the contacts (e.g., 212C) and the power reception contact (e.g., 212A). The bus interconnect may be elevated over a surface of the motherboard while the multifunction power bus distributes the power from the power supply. For example, bus interconnect 212B and its contacts at either end may include sufficient mechanical rigidity to support itself. While not illustrated in FIG. 2A, portions of bus interconnect 212B may also be attached to motherboard 200 via offsets or other structures for mechanical stability purposes.

By operably connecting power supply 104 to various power ingress points (e.g., 210) of motherboard 200, power may be distributed to various locations on motherboard 200 and/or devices connected to motherboard. Consequently, high speed connections 208 may be implemented with fewer constraints such as inclusion of power distribution components (e.g., power distribution traces) in motherboard 200. Accordingly, high speed connections 208 may be able to support higher communication rates/bandwidths when compared to the connections of motherboards that distribute power from power supplies to connected devices.

In an embodiment, multifunction power bus 212 also provides for mechanical stability of devices connected to connector 206. For example, a portion of bus interconnect 212B proximate to connector 206 may also include one or more multifunction connectors (e.g., 220). Multifunction connectors may (i) mechanically connect a device connected to connector 206 to the bus interconnect thereby allow for force transmission to motherboard 200 through the bus interconnect and/or (ii) directly power the device attached to connector 206. For example, multifunction connector 220 may facilitate formation of a connection through which power may be provided to the device which is being mechanically stabilized.

Multifunction connector 220 may be implemented, for example, with a bolt or other structure that may attached to multifunction power bus and the device connected to connector 206. Refer to FIGS. 5A-5H for additional details regarding devices supported by and/or powered through a multifunction bus.

By including the components as discussed above, a data processing system in accordance with embodiments disclosed herein may provide higher performance through increased communication rates, greater flexibility in design by abstracting power distribution away from motherboards, greater flexibility in design by abstracting mechanical stabilization away from motherboards, and/or reduced manufacturing cost through standardization (e.g., motherboard design may be standardized, with only multifunction power bus and/or adapter plates being customized to meet the needs of various devices connected to a motherboard).

Figure 2B:
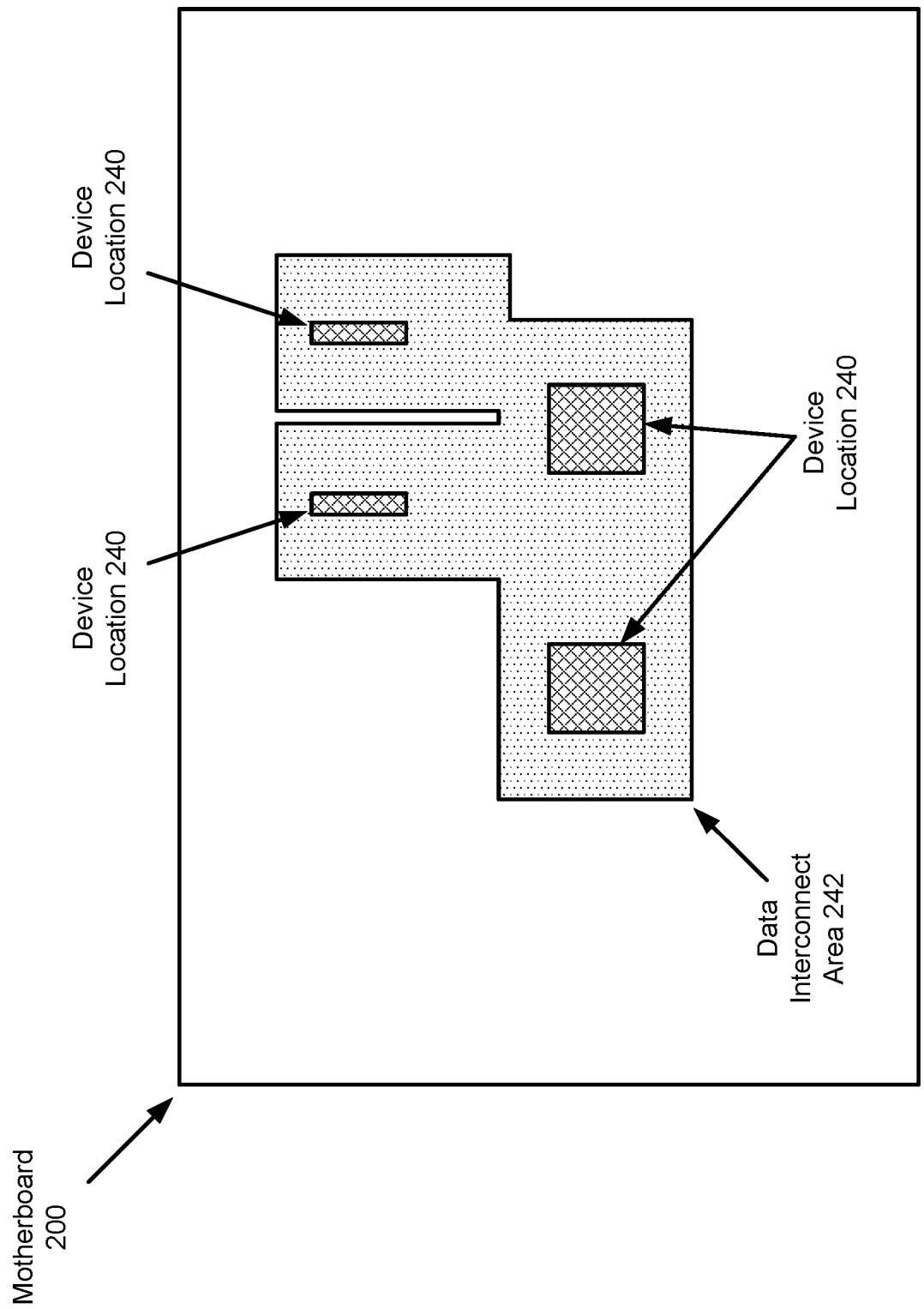
FIG. 2B shows a diagram illustrating a first top view of a motherboard of a data processing system in accordance with an embodiment.

For example, turning to FIG. 2B, a top view diagram illustrating the surface area of motherboard 200 in accordance with an embodiment is shown. The surface of motherboard 200 may generally be divided into device locations (e.g., 240) where devices will be positioned (e.g., connectors may be located in device locations) and data interconnect areas (e.g., 242). To facilitate optimal communications between the devices positioned at the device locations, the data interconnect area 242 of motherboard 200 may need to be used substantially exclusively for high speed connections 208 (which may be implemented on top and/or mid-layers of circuit cards). However, as seen in FIG. 2B, these areas are proximate to the device locations.

Figure 2C:
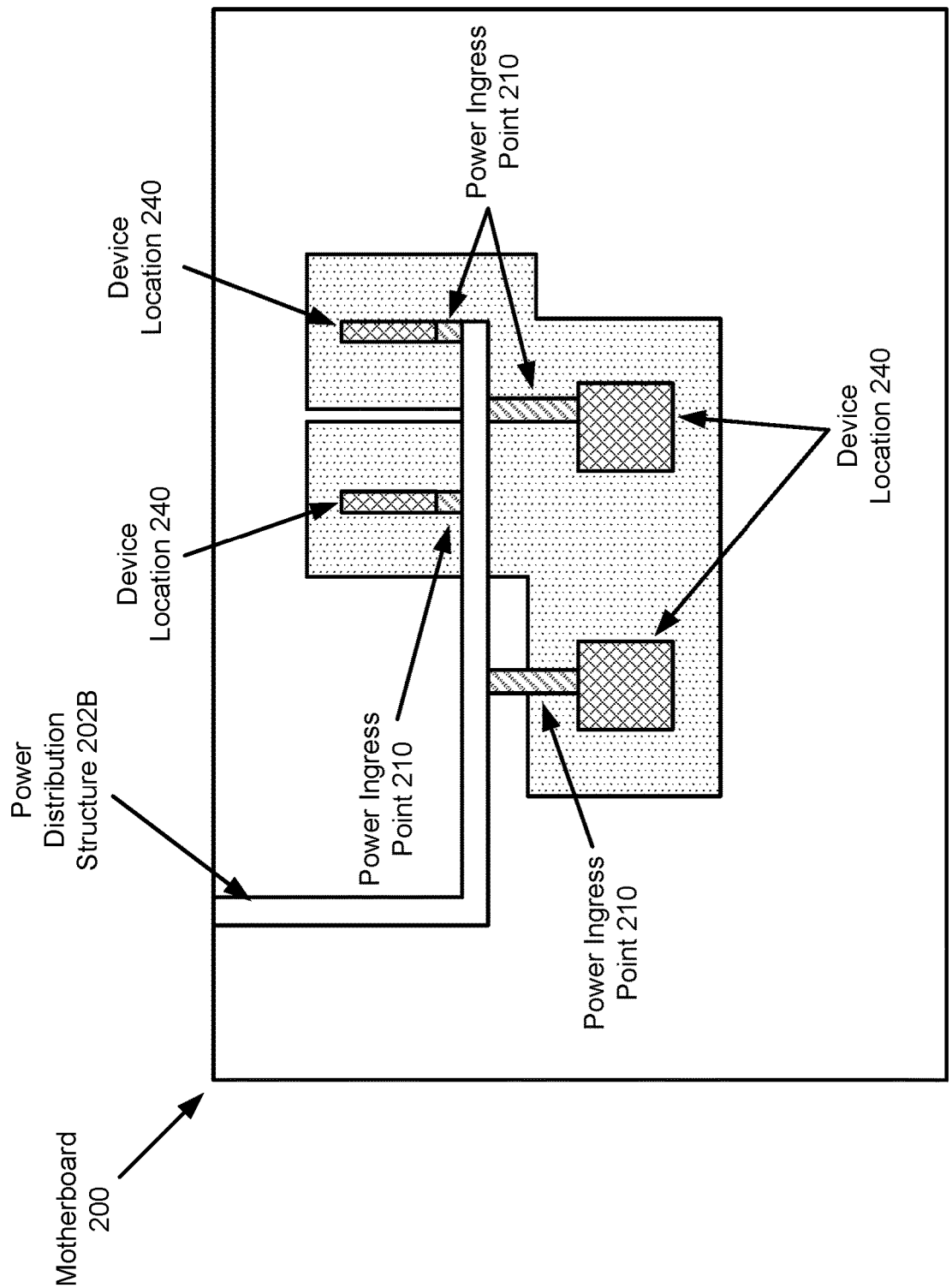
FIG. 2C shows a diagram illustrating a second top view of a motherboard of a data processing system in accordance with an embodiment.

To power and mechanically stabilize the devices in device locations, a portion of data interconnect area 242 may be utilized for providing such services thereby reducing the efficiency of communications between the devices. For example, tuning to FIG. 2C, a second top view diagram of motherboard 200 in accordance with an embodiment is shown. As seen in FIG. 2C, if motherboard 200 is required to support power distribution to the device locations, then power distribution structure 202B (e.g., a power plate/traces) may prevent positioning of high speed connections 208 in optimal locations. Further, power ingress points (e.g., 210) from power distribution structure 202B to the device locations may further prevent optimal placement of high speed connections 208.

Figure 2D:
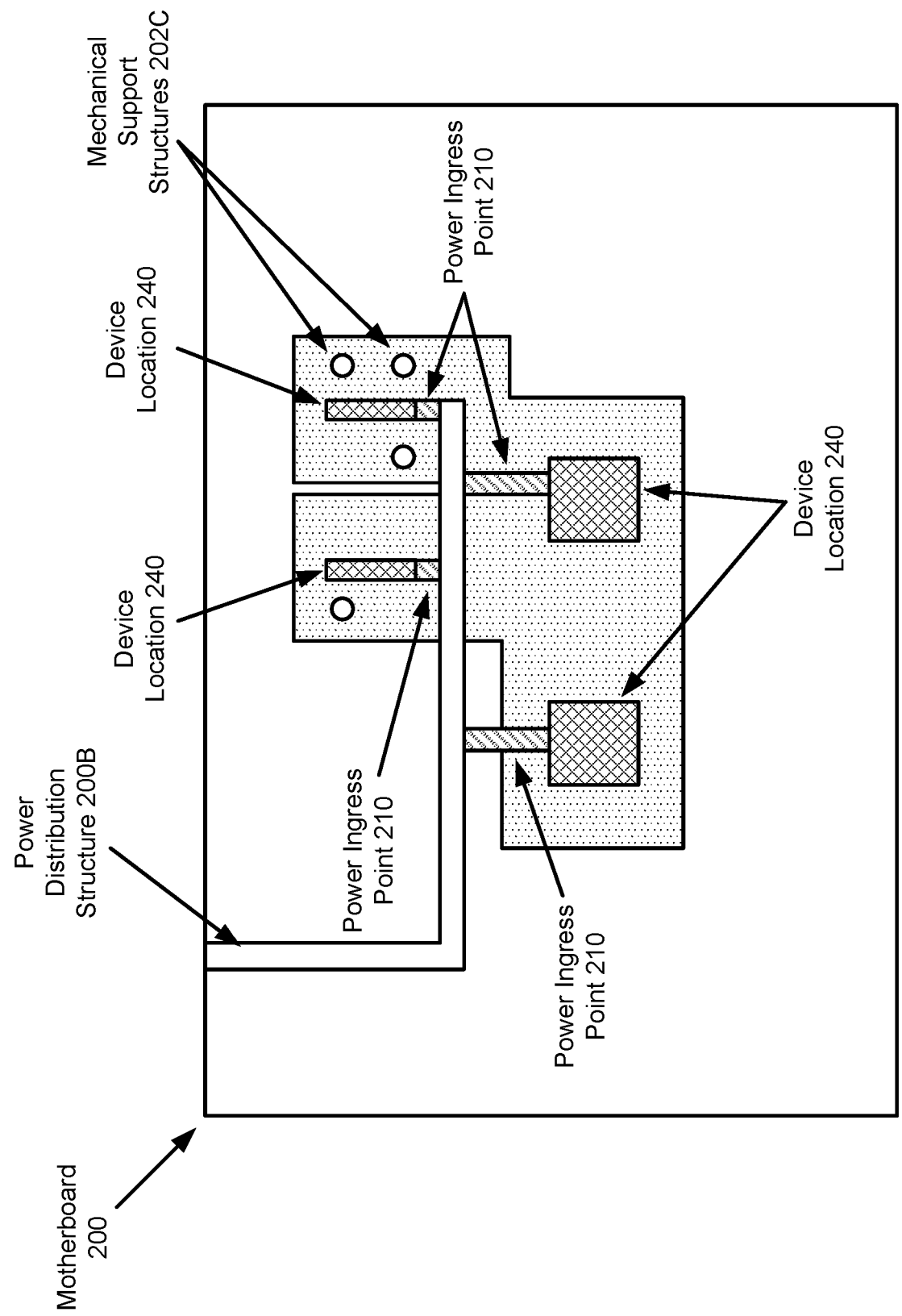
FIG. 2D shows a diagram illustrating a third top view of a motherboard of a data processing system in accordance with an embodiment.

In another example, turning to FIG. 2D, a third top view diagram of motherboard 200 in accordance with an embodiment is shown. As seen in FIG. 2D, if motherboard 200 is required to mechanically stabilize devices, then mechanical support structures 202C (e.g., holes or other structures that allow attachment of other devices to motherboard 200) may prevent positioning of high speed connections 208 in optimal locations. Further, due to the varying mechanical support needs of different devices, these mechanical support structures 202C of motherboard 200 may need to be positioned differently for different devices which may require many different types of motherboards to be available to support a broad array of devices that may connect to motherboards.

Returning to the discussion of FIG. 2A, by implementing a system as discussed above, the competition for motherboard area for providing different types of services may be reduced.

While the system of FIG. 2A has been illustrated as including a limited number of specific components, a system may include different numbers, types, and/or quantities of components without departing from the embodiments disclosed herein.

As discussed above, data processing systems in accordance with embodiments disclosed herein may include multifunction power buses and adapter plates. The data processing systems may include any number of these components. FIGS. 3A-6 show examples of data processing systems in accordance with an embodiment that include one or more of these components. In these figures, portions of data processing systems are illustrated with short dashed lines at various edges of the drawings indicating that the structures depicted therein may continue beyond the edges of the drawings.

Turning to FIGS. 3A-3F, these figures illustrate examples of adapter plates of data processing systems in accordance with an embodiment. The adapter plates may facilitate use of a broad variety of different devices that may need to be mechanically stabilized.

Figure 3A:
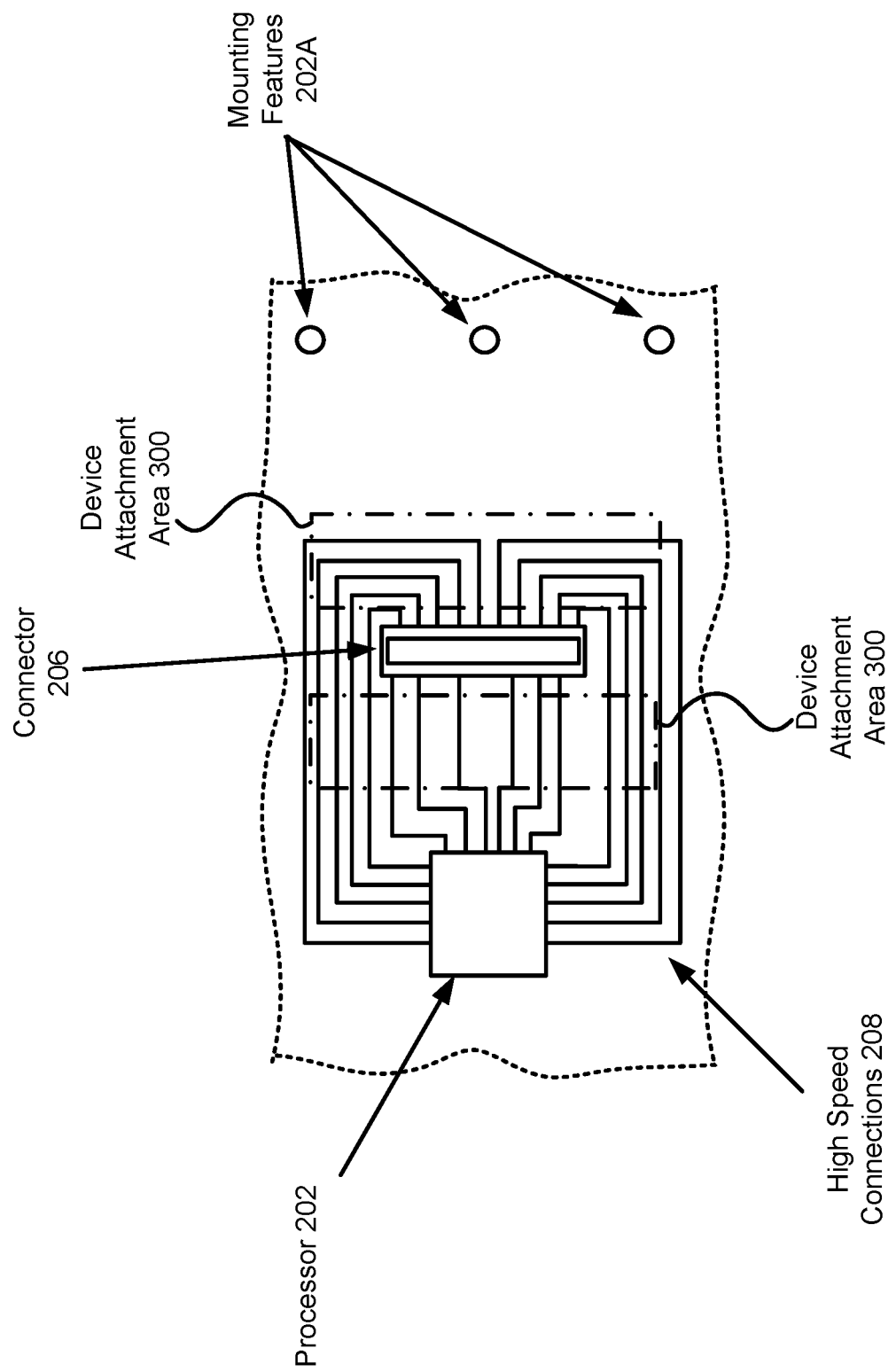
FIG. 3A shows a diagram illustrating a first top view of a portion of a motherboard of a data processing system in accordance with an embodiment.

Turning to FIG. 3A, a top view diagram of a motherboard of a data processing system in accordance with an embodiment is shown. A seen in the figure, the motherboard may include high speed connections 208 that provide for operable connectivity between processor 202 and connector 206. Depending on the device that attaches to connector 206, various mechanical stabilization requirements may need to be met. Generally, the mechanical stabilization requirements may require that mechanical load from the connected device be dissipated. Different devices may include various types and quantities of mechanical mounting hardware.

To dissipate the mechanical load from a connected device, mounting features corresponding to the mechanical mounting hardware may be positioned on the motherboard. Generally, the mechanical mounting hardware of a device may be proximate to where contacts of the device may be located. Consequently, it may be possible to position mounting features (e.g., holes) in the device attachment areas (e.g., 300) illustrated in FIG. 3A. However, doing so may require portions of high speed connections 208 to be placed elsewhere which may negatively impact communications via high speed connections 208. Further, due to the wide variety of mechanical mounting hardware (e.g., holes, pins, etc.) and its location relative to contacts of a device, it may not be possible to include mounting features in a motherboard that is able to accommodate all possible devices.

To provide for broad compatibility with various devices, motherboard may include mounting features 202A. Mounting features 202A may generally be positioned away from the optimal areas of motherboard for high speed connections 208, and may be implemented in a standardized manner. By doing so, a broad arrange of adapter plates may be able to be attached to the motherboard via mounting features 202A without negatively impacting communications via high speed connections 208.

Figure 3B:
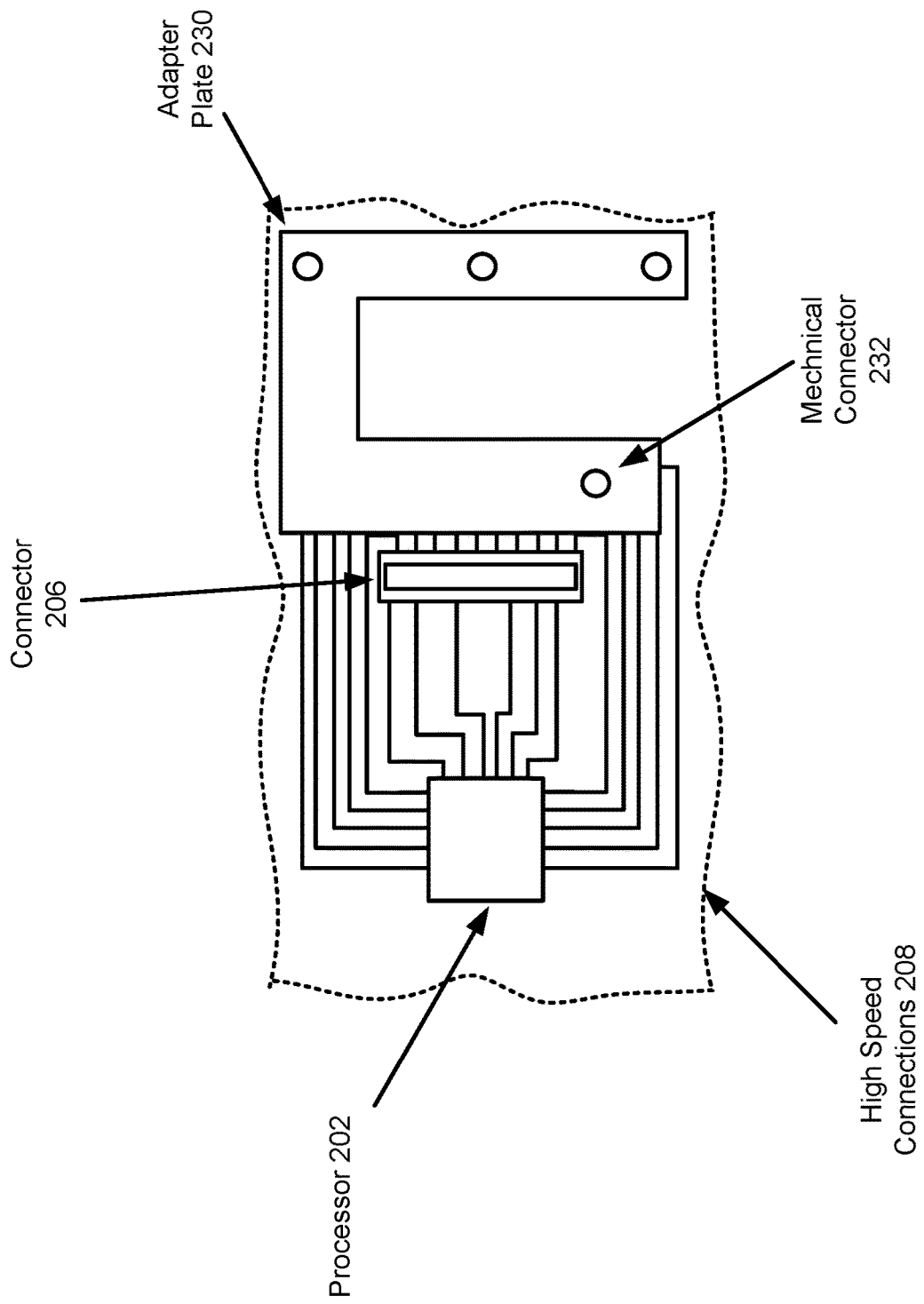
FIG. 3B shows a diagram illustrating a second top view of a portion of a motherboard and an adapter plate of a data processing system in accordance with an embodiment.
Figure 3C:
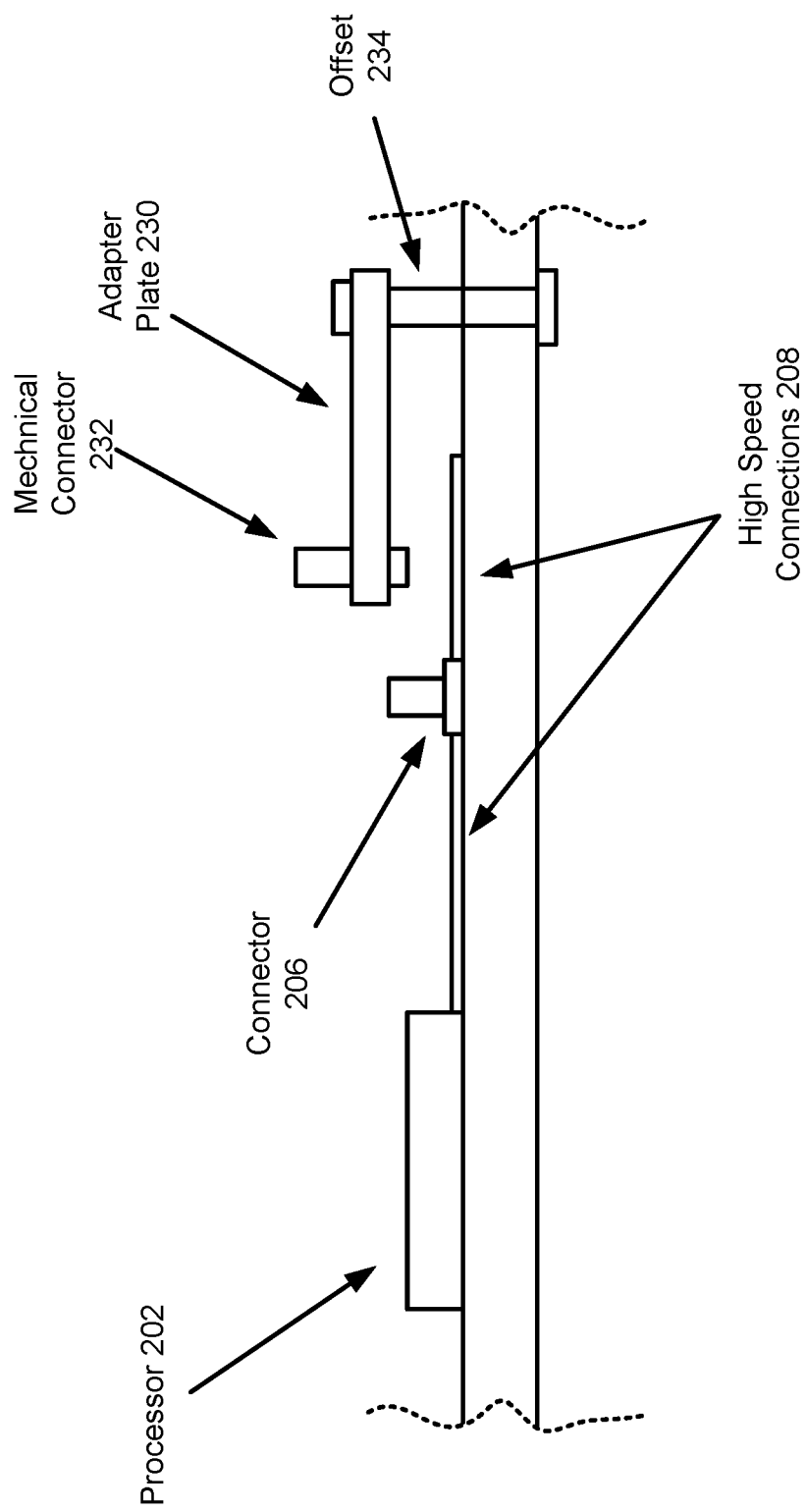
FIG. 3C shows a diagram illustrating a first side view of a portion of a motherboard and an adapter plate of a data processing system in accordance with an embodiment.

Turning to FIGS. 3B-3C, these figures show top and side view, respectively, of adapter plate 230 attached to the motherboard of FIG. 3A in accordance with an embodiment. To facilitate the attachment, one or more offsets (e.g., 234) may be positioned with the mounting features. The offsets may distance adapter plate 230 from the motherboard, and may positioned and/or orient the adapter plate 230 with respect to the motherboard.

Adapter plate 230 may include, as discussed above, two sets of holes or other structures for facilitating mechanical attachment to other devices. One set of holes may correspond to mounting features 202A of the motherboard, and the other set of holes may correspond to the mechanical mounting hardware of a device to connect to connector 206.

As seen in these figures, the other set of holes may be positioned above the device attachment area such that the other set of holes are plated and/or oriented with respect to where the mechanical mounting hardware of the device will be positioned/oriented while the device is connected to connector 206.

To facilitate attachment of the device to adapter plate 230, one or more of mechanical connector 232 may be utilized. The mechanical connectors may facilitate attachment of the device to the second hole pattern. For example, mechanical connector 232 may be implemented with bolts, pins, and/or other types of structures.

Figure 3D:
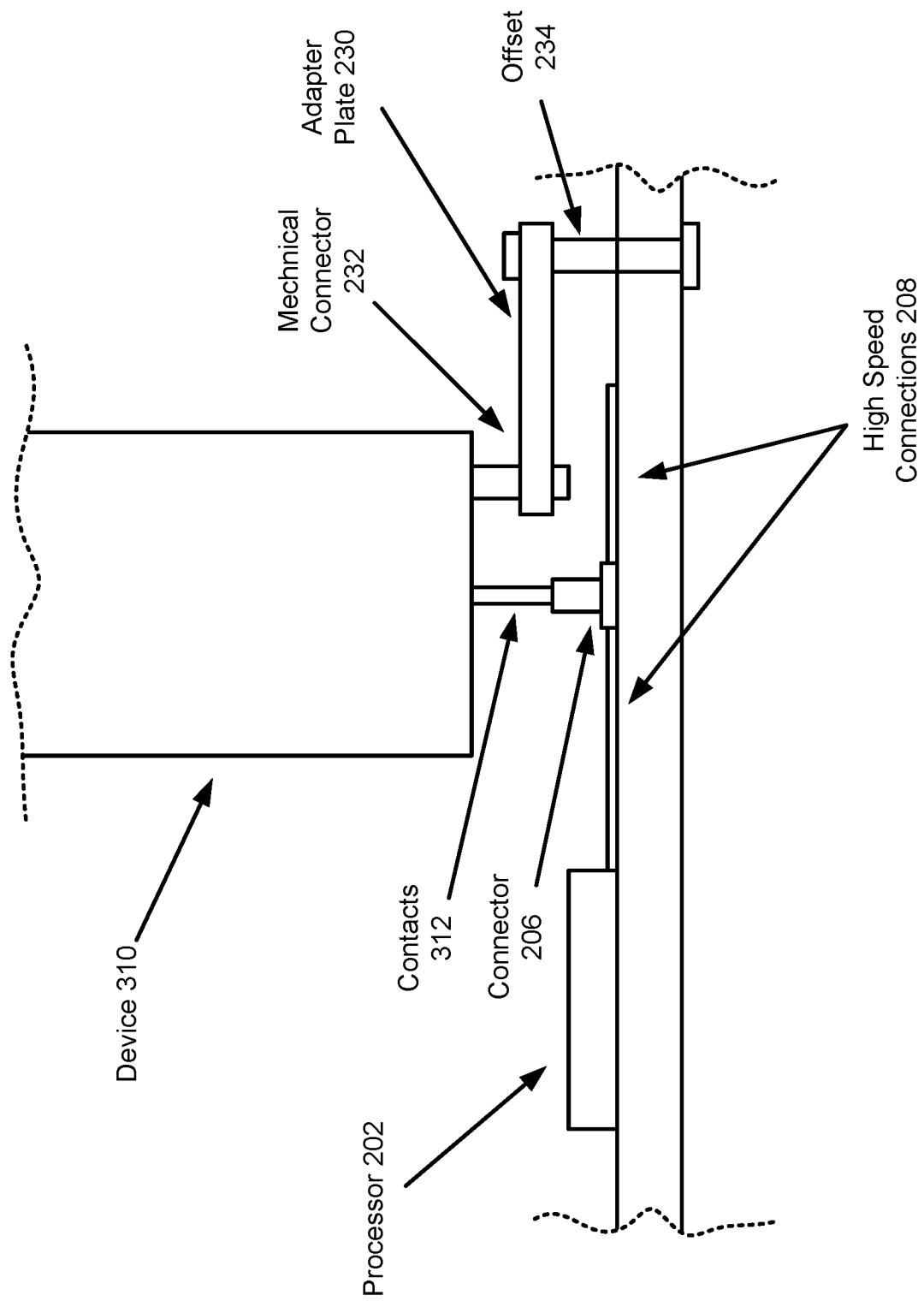
FIG. 3D shows a diagram illustrating a first side view of a portion of a motherboard, adapter plate, and a device of a data processing system in accordance with an embodiment.

Turning to FIG. 3D, a side view diagram similar to FIG. 3C with device 310 attached to connector 206 in accordance with an embodiment is shown. A seen in FIG. 3D, device 310 may include contacts 312 (e.g., electrical contacts such as a card edge connector or other type of electrical contact set that corresponds to connector 206) that may form electrical connections with connector 206 thereby operably connecting device 310 to other devices on the motherboard via the high speed connections 208. To dissipate mechanical load on device 310 (that may otherwise negatively impact it and/or the motherboard), device 310 may be connected to the motherboard via adapter plate 230.

As discussed above, the use of a standardized mounting features may provide for compatibility with a broad array of different devices. To do so, various adapter plates having a hole pattern corresponding to the standardized mounting features of the motherboard may be obtained, but that include a variety of different hole patterns (or other mounting structures) for attachment of devices. In this manner, a standardized motherboard may be manufactured usable with different adapter plates to provide for compatibility with devices that have various mechanical mounting hardware.

Figure 3E:
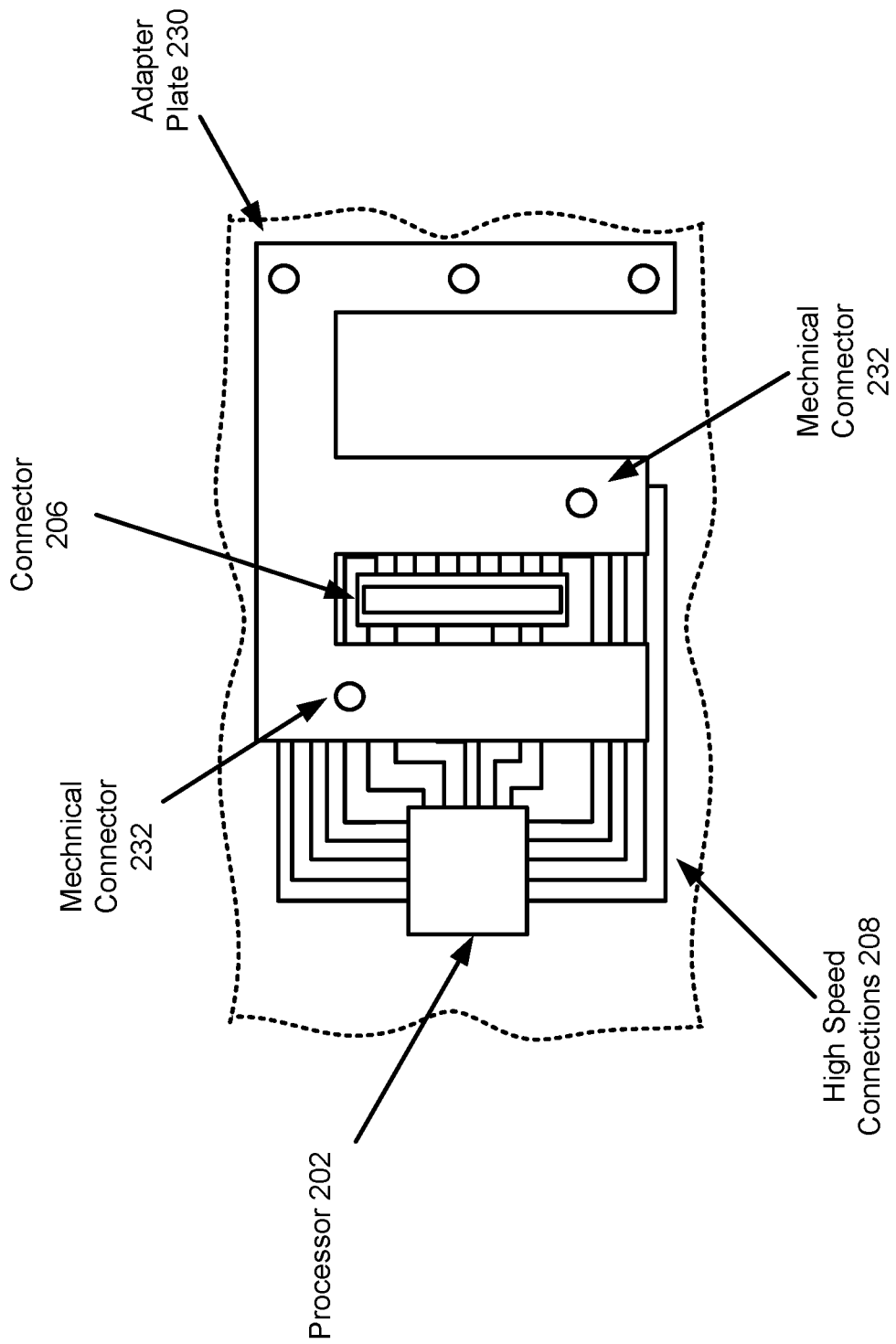
FIG. 3E shows a diagram illustrating a first top view of a portion of a motherboard and a second adapter plate of a data processing system in accordance with an embodiment.
Figure 3F:
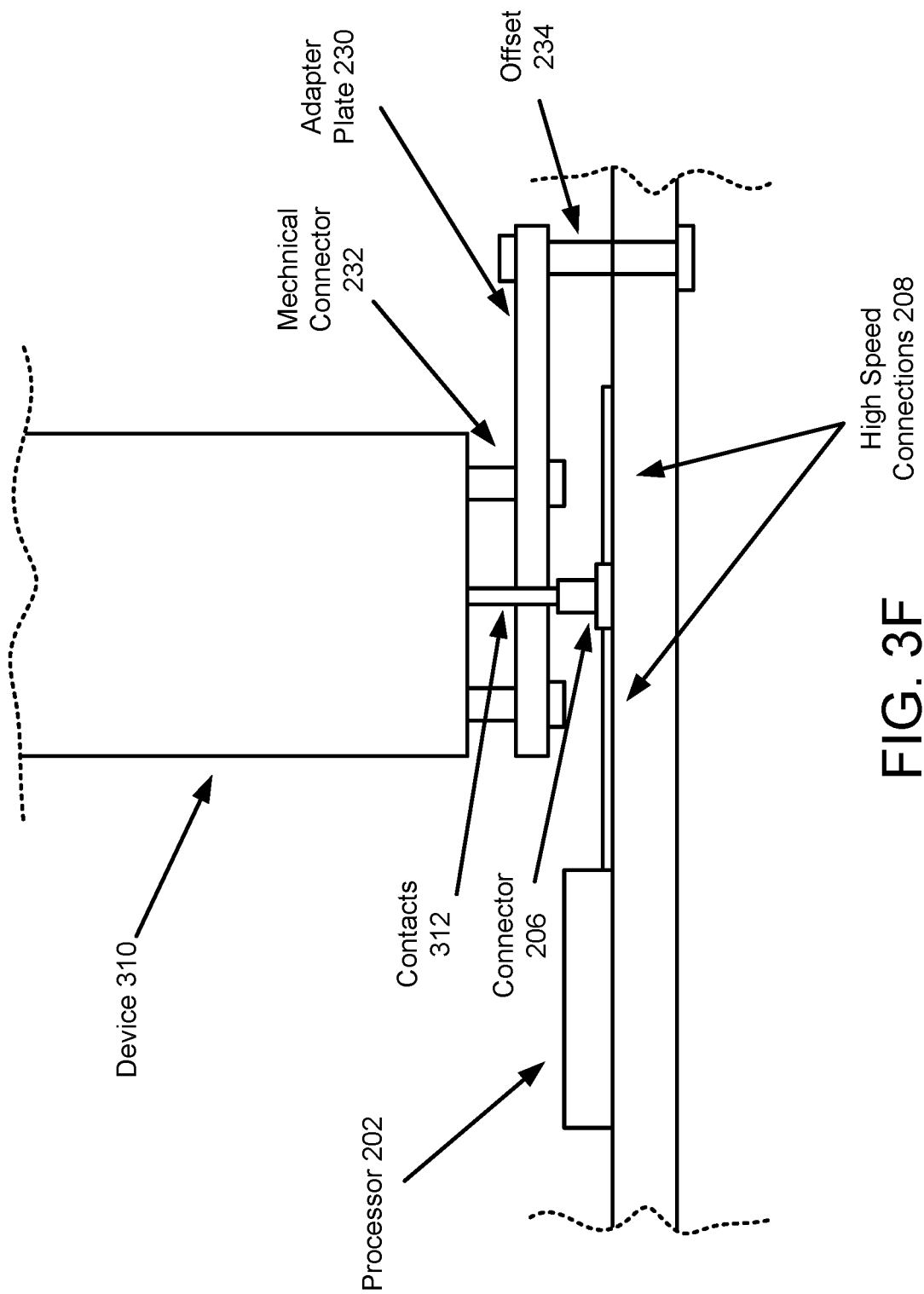
FIG. 3F shows a diagram illustrating a first side view of a portion of a motherboard and a second adapter plate of a data processing system in accordance with an embodiment.

Turning to FIGS. 3E-3F, top view and side view diagrams, respectively, that are similar to FIGS. 3B and 3D in accordance with an embodiment are shown. However, in FIGS. 3E-3F, adapter plate 230 has a different shape, size, and hole pattern for mounting a device to it. For example, adapter plate 230 may include mechanical connectors on two sides of connector 206. These mechanical connectors may be included due to the different mechanical loads from the device that may need to be dissipated. For example, in contrast to the device shown in FIG. 3D, the device shown in FIG. 3F may be larger in size (e.g., longer wider), may include heavier components, and/or may be more sensitive to mechanical deformation. However, by including the standardized mounting features, the same motherboard may be compatible with board devices through use of the different adapter plates.

While examples of motherboards and adapter plates have been illustrated in FIGS. 3A-3F, it will be appreciated that a motherboard may be used with multiple adapter plates and/or different types of adapter plates shown herein without departing from embodiments disclosed herein. Further, while illustrating adapter plates corresponding to a single connector, an adapter plate may include multiple hole sets (or other sets of mounting features) that may correspond to any number of connectors. Consequently, multiple devices may be mechanically connected to a single adapter plate. Likewise, while the motherboard has been illustrated as having some mounting features, a motherboard may include multiple mounting features positioned to allow any number of adapter plates to be attached to it.

Through the use of adapter plates, the requirements of dissipating mechanical loads may, in part, be abstracted from the motherboard. Consequently, a standardized motherboard may be used that is compatible with a wide variety of devices having various mechanical load dissipation requirements.

In addition to mechanical abstraction, a system in accordance with embodiments disclosed herein may also facilitate power distribution abstraction away from motherboards. To do so, multifunction power buses may be utilized that reduce the use of motherboards for power distribution.

Turning to FIGS. 4A-4F, these figures illustrate examples of multifunction power buses of data processing systems in accordance with an embodiment. The multifunction power buses may facilitate power distribution abstraction from motherboards.

Figure 4A:
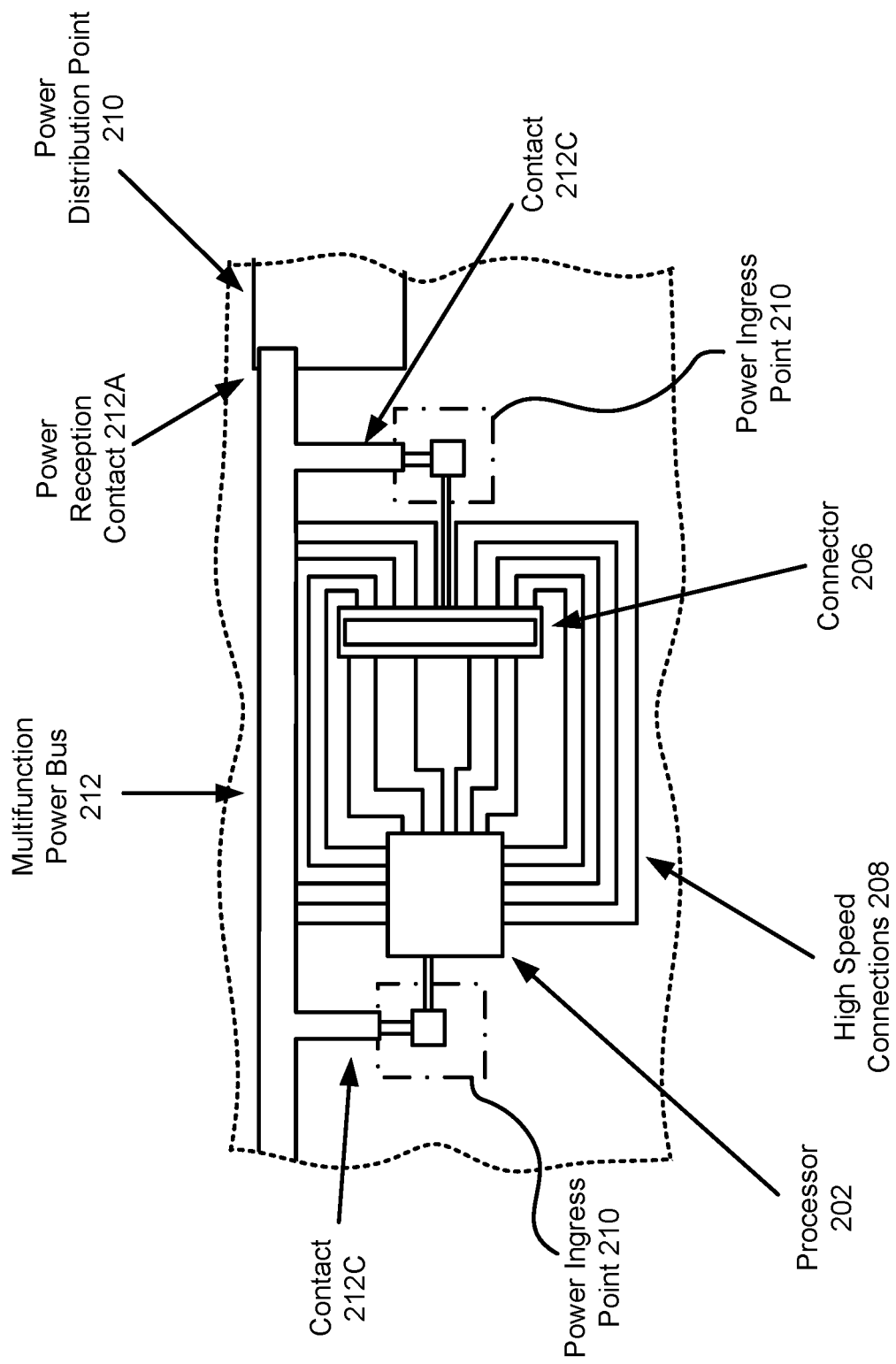
FIG. 4A shows a diagram illustrating a first top view of a portion of a motherboard and a multifunction power bus of a data processing system in accordance with an embodiment.
Figure 4B:
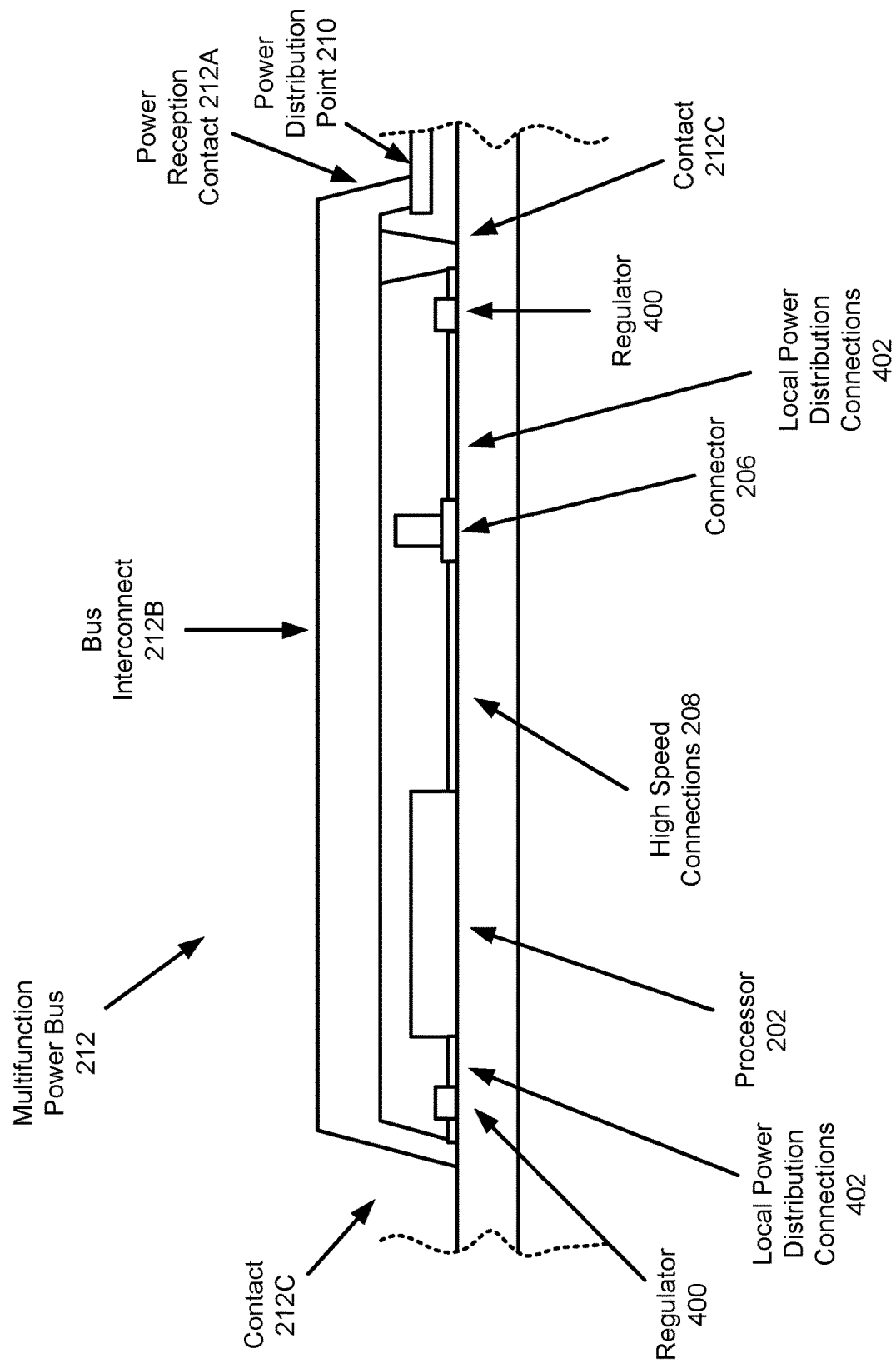
FIG. 4B shows a diagram illustrating a first side view of a portion of a motherboard and a multifunction power bus of a data processing system in accordance with an embodiment.

Turning to FIGS. 4A-B, a top view diagram and side view diagram, respectively, of a motherboard of a data processing system in accordance with an embodiment is shown. A seen in the figure, the motherboard may include high speed connections 208 that provide for operable connectivity between processor 202 and connector 206. The processor 202 and connector 206 may need to obtain power so that the processor 202 and device connected to connector 206 may operate. Consequently, there may be various power ingress points 210 on motherboard to where power from a power source must be distributed. In these power ingress points, regulators (e.g., 400, which may be implemented with a voltage regulator), local power distribution connections 402, and/or other structures may be positioned that provide conditioned power to processor 202 and/or connector 206 using power from a power supply or other power source.

One approach to distributing power to power ingress point 210 is to include various traces and/or power plates on the motherboard. However, the placement of these power distribution structures may result in portions of high speed connections 208 being placed in less desirable area (e.g., due to limited real estate being present on motherboard) which results in high speed connections 208 being negatively impacted (e.g., may reduce communication rates over portions of high speed connections 208).

As seen in FIG. 4A, rather than relying on the motherboard for power distribution, the date processing system may include one or more of multifunction power bus 212. Multifunction power bus 212, like an adapter plate, may be elevated over portions of the motherboard thereby facilitate power distribution to various locations on the motherboard without utilizing the motherboard for power distribution (e.g., thereby abstracting power distribution from the motherboard).

To distribute power, multifunction power bus 212 may include, for example, a power reception contact 212A (e.g., a plate, molex connector, or other type of electrical connector) which may be electrically connected to a power supply structure such as a power distribution point 211 (e.g., a terminal, plate, bus, etc.) from a power supply. Multifunction power bus 212 may also include any number of contact 212C. Contact 212C may electrically connect to a corresponding power ingress point of the motherboard (e.g., using a board connector, edge connector, or other structures). Power reception contact 212A and contact 212C may be electrically connected via bus interconnect 212B.

Through the use of multifunction power bus 212, power may be distributed to any number of power ingress points on a motherboard. By doing so, the power distribution for the motherboard may be abstracted from the structure of the motherboard. Further, the power distribution capacity and capabilities may be modified by utilizing different multifunction power buses. For example, different multifunction power buses having different thickness conductors thereby having different power transmission capacities may be utilized. Consequently, similarly to the use of adapter plates, the use of a multifunction power bus may allow for a standardized motherboard to be utilized which may be adapted for use with various devices that have varying power consumption rates through the use of varying multifunction power buses.

In an embodiment, multiple multifunction power buses are utilized. The multiple multifunction power buses may facilitate power distribution to other power ingress points and/or to locations (e.g., off-board components).

Figure 4C:
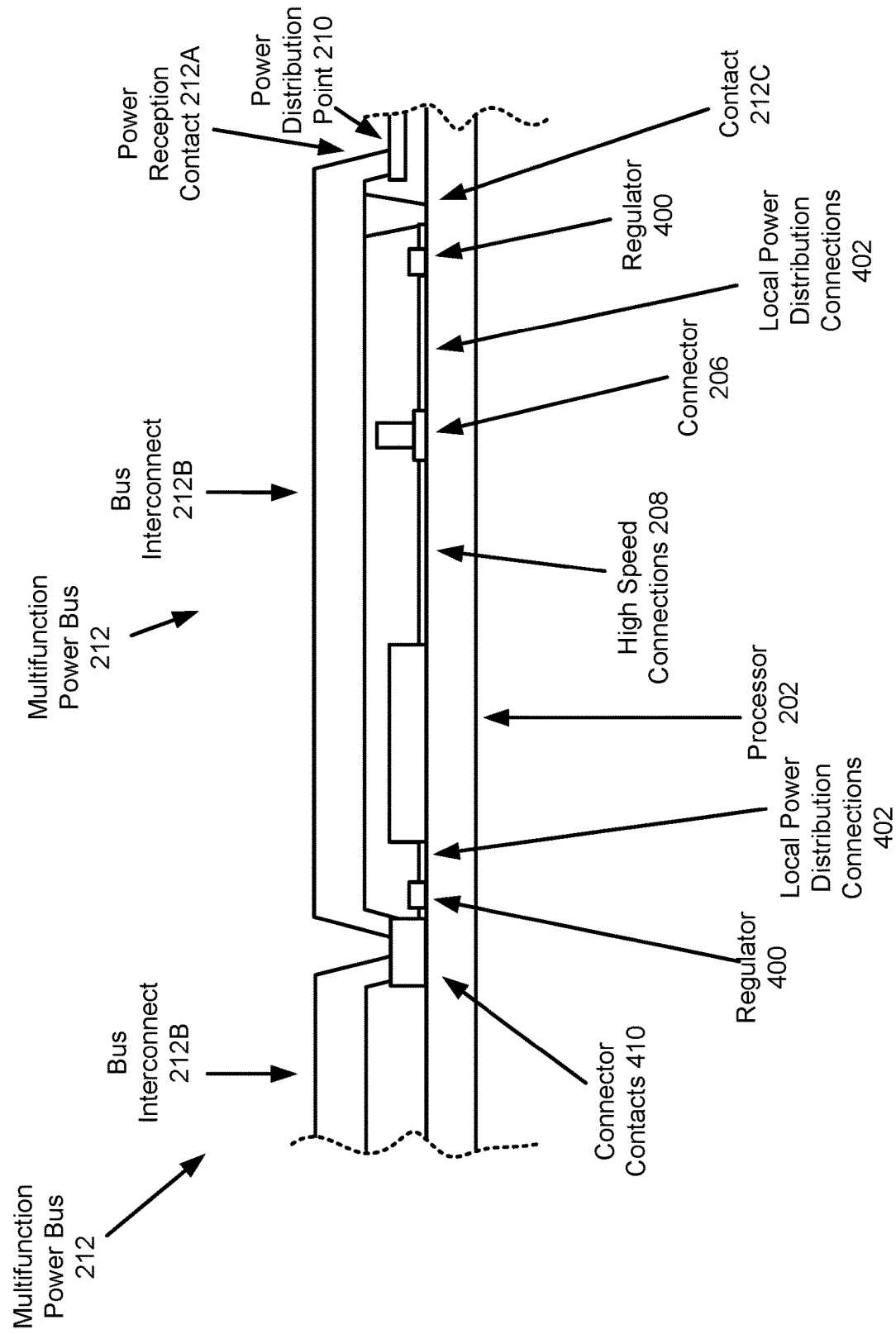
FIG. 4C shows a diagram illustrating a first side view of a portion of a motherboard and two multifunction power buses of a data processing system in accordance with an embodiment.
Figure 4D:
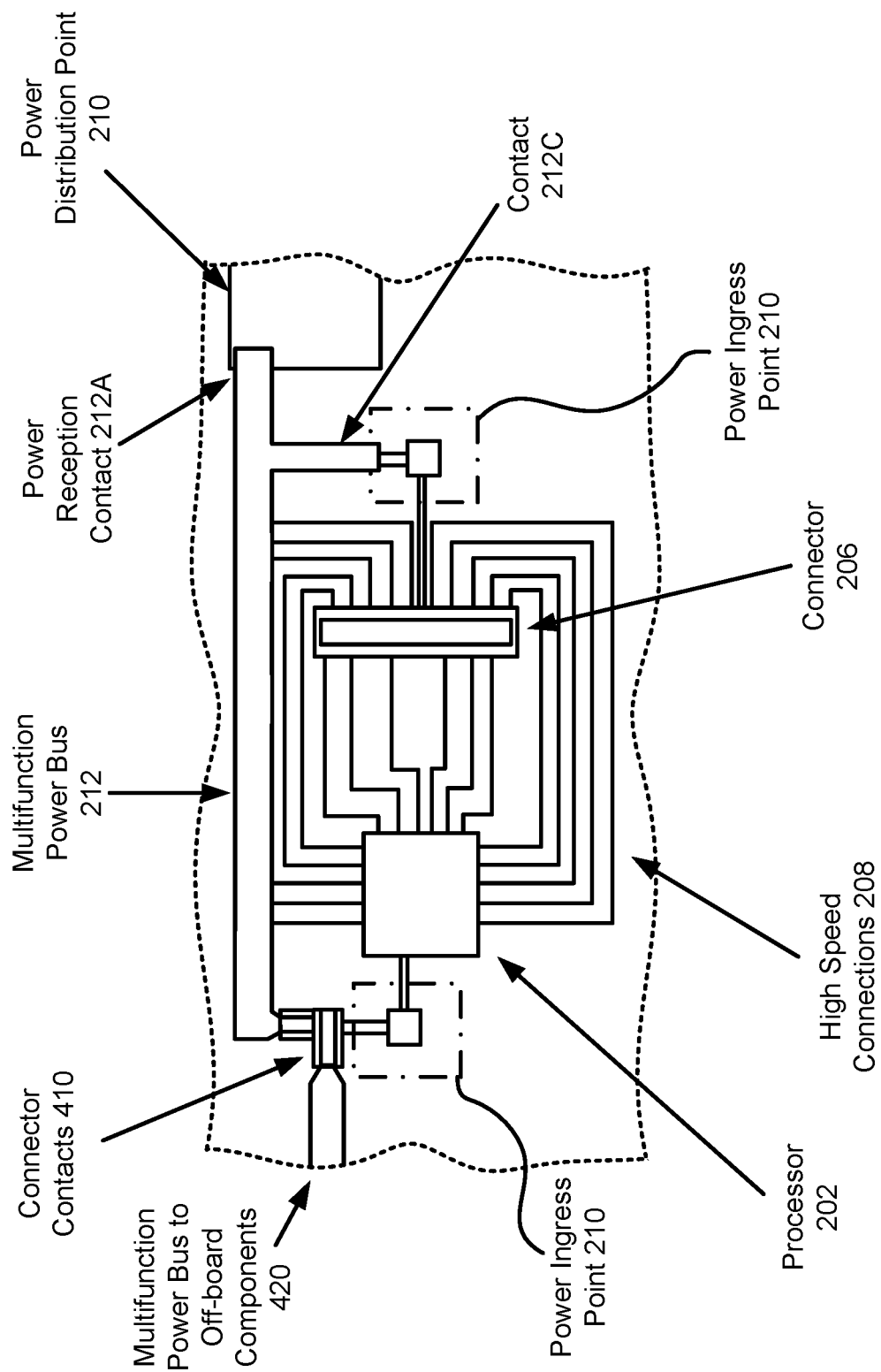
FIG. 4D shows a diagram illustrating a first top view of a portion of a motherboard and two multifunction power buses of a data processing system in accordance with an embodiment.

Turning to FIGS. 4C-4D, a side view diagram and top view diagram, respectively, of serially arranged power buses in accordance with an embodiment are shown. To facilitate serial connections, all, or a portion, of the contacts of the multifunction power buses may be implemented as connector contacts 410. The connector contacts may be implemented with any type of standardized contacts such as molex connectors. The connector contacts may allow for other connector contacts of other multifunction power buses to be operably connected thereby facilitating further power distribution beyond that provided by a single multifunction power bus. For example, as illustrated in FIG. 4D, a multifunction power bus to off-board components 420 may be connected to the multifunction power bus 212. Multifunction power bus to off-board components 420 may distribute power to devices that may not be positioned on a motherboard such as, for example, hard disk drives, solid state disk drives, controllers, communications devices, and/or other types of devices. The different power buses may have different power distribution capacities.

Figure 4E:
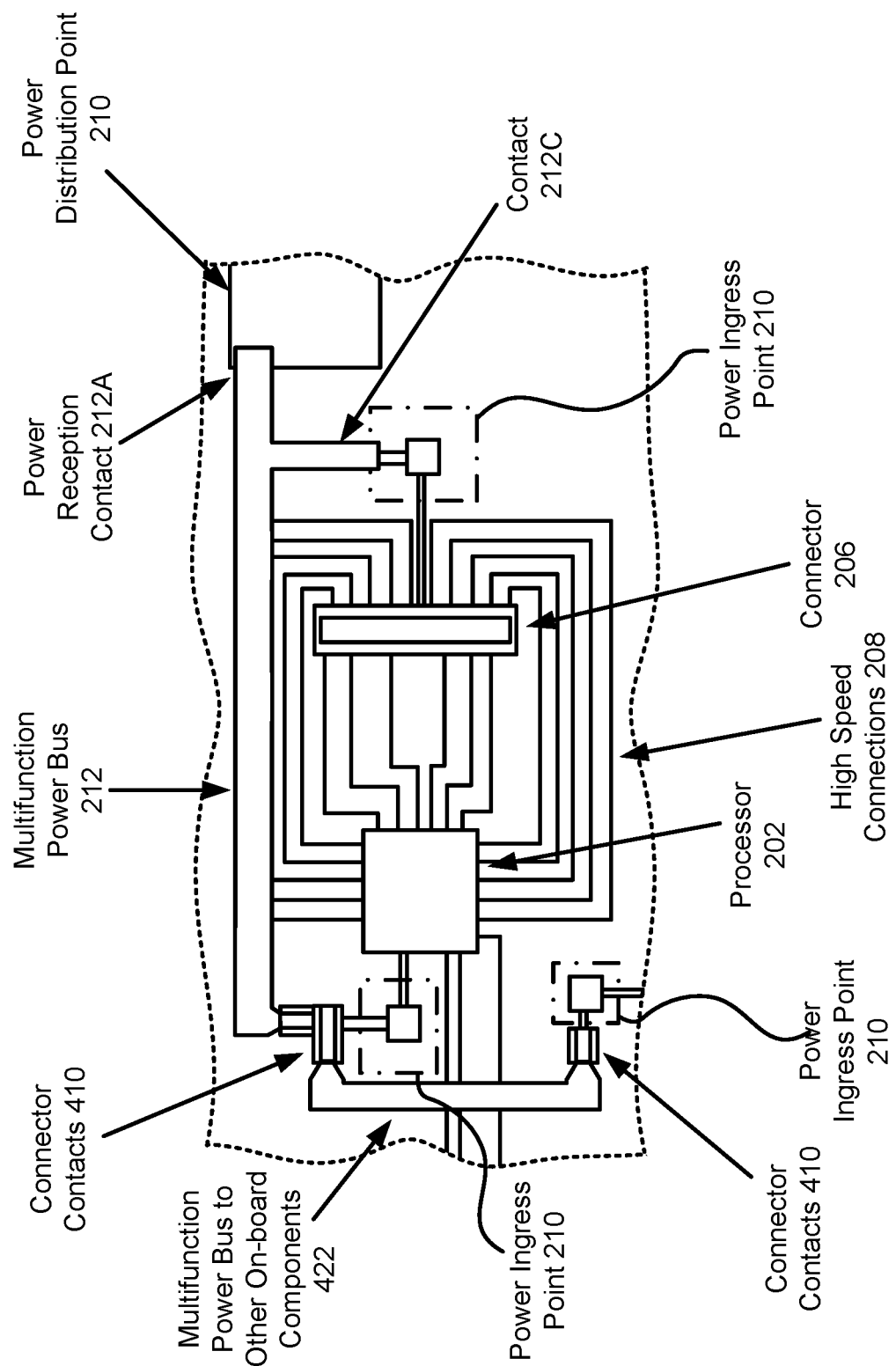
FIG. 4E shows a diagram illustrating a second top view of a portion of a motherboard and two multifunction power buses of a data processing system in accordance with an embodiment.

However, the other multifunction power bus may also, or alternatively, distribute power to other power ingress points on a motherboard. Turning to FIG. 4E, a top view diagram similar to that shown in FIG. 4D as shown. However, in contrast to FIG. 4D, the data processing system may include a multifunction power bus to other on-board components 420 (e.g., the power ingress point 210 located in the bottom left hand corner of the drawing).

While FIGS. 4D and 4E are drawn as including different types of power buses, a data processing system in accordance with embodiments disclosed herein may include any number and type of multifunction power bus that may include contacts and/or connector contacts.

Figure 4F:
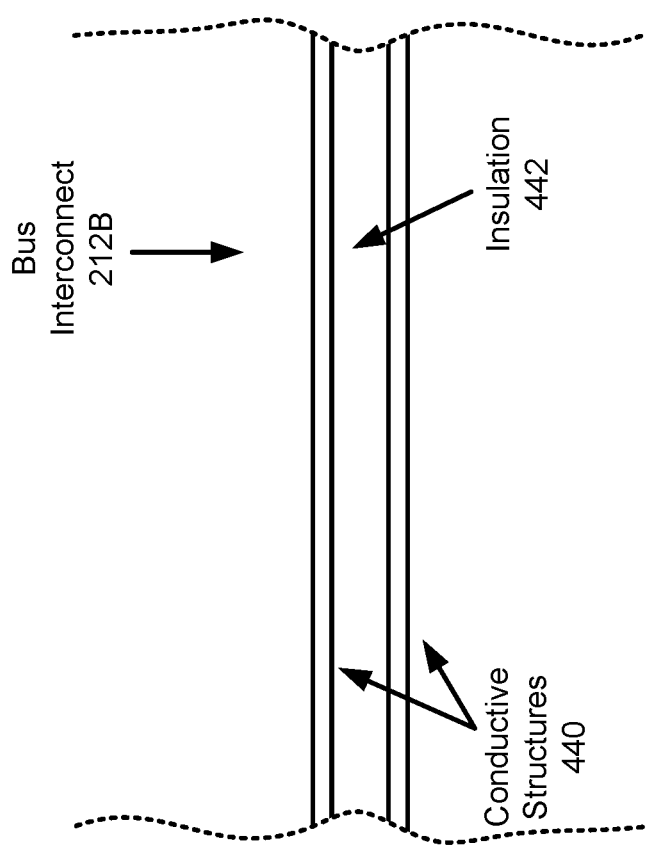
FIG. 4F shows a diagram illustrating a first side view of a portion of a multifunction power bus of a data processing system in accordance with an embodiment.

To facilitate distribution of power between the various contacts, a multifunction power bus may include a bus interconnect. Turning to FIG. 4F, a side view diagram of bus interconnect 212B in accordance with an embodiment is shown. Bus interconnect 212B may include conductive structure 440 that may carry electrical current to and from the contacts of a multifunction power bus. Conductive structures 440 may be separated from each other by insulation 442 (e.g., electrical insulation).

In an embodiment, bus interconnected 212B is implemented with a circuit card (or other structure that includes two metallization layers separated by a dielectric, such as metallized polyimide film). Conductive structures 440 may be implemented using the metallization of the circuit card. For example, the metallization layers on the circuit card may be structured into any number of conductive paths separated from each other by space and/or insulation 442 (e.g., the dielectric core of the circuit card). The width and size of the structured conductive paths and/or thickness of insulation 442 may be manufactured to support various levels of power transmissions and/or mechanical rigidity.

Bus interconnect 212B may be implemented with other structures without departing from embodiments disclosed herein. For example, conductive metal bars wrapped in electrical insulation may be used to implement bus interconnect 212B without departing from embodiments disclosed herein.

The contacts to which bus interconnect 212B attached may be implemented with any number and/or types of connectors. For example, some contacts may simply be exposed ends of the circuit card/other structures, while other contacts may be implemented with connectors that may meet the requirements of a connector standard.

While illustrated in FIG. 4F as including a specific number, type, and arrangement of components, a bus interconnect may include different numbers and/or types of components and may be arranged differently from that shown herein without departing from embodiments disclosed herein.

Figure 5A:
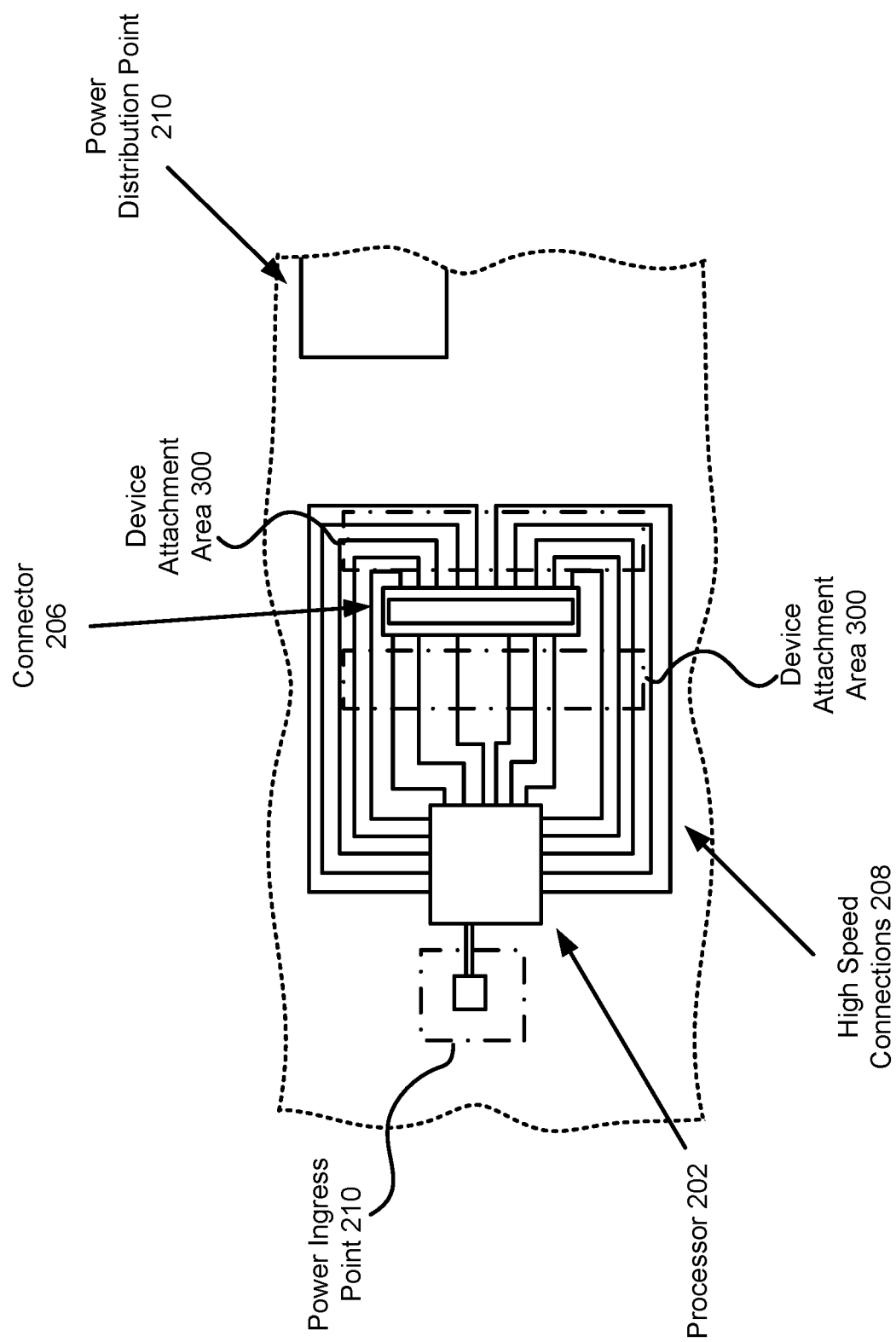
FIG. 5A shows a diagram illustrating a first top view of a portion of a motherboard and multiple areas positioned thereon of a data processing system in accordance with an embodiment.

In addition to facilitating abstraction of power distribution from motherboards, a multifunction power bus may also facilitate mechanical abstraction for mechanical stabilization from motherboards and/or direct powering of devices that may connect to motherboards. Turning to FIGS. 5A-4H, these figures illustrate examples of multifunction power buses of data processing systems in accordance with an embodiment. The multifunction power buses may facilitate power distribution abstraction and mechanical load dissipation from motherboards.

Turning to FIG. 5A, a top view diagram of a motherboard of a data processing system in accordance with an embodiment is shown. A seen in the figure, the motherboard may include high speed connections 208 that provide for operable connectivity between processor 202 and connector 206. The processor 202 and connector 206 may need to obtain power so that the processor 202 and device connected to connector 206 may operate and may need to provide mechanical stabilization services for devices connected to connector 206. Consequently, there may be various power ingress points 210 and device attachment areas 300 on the motherboard.

Figure 5B:
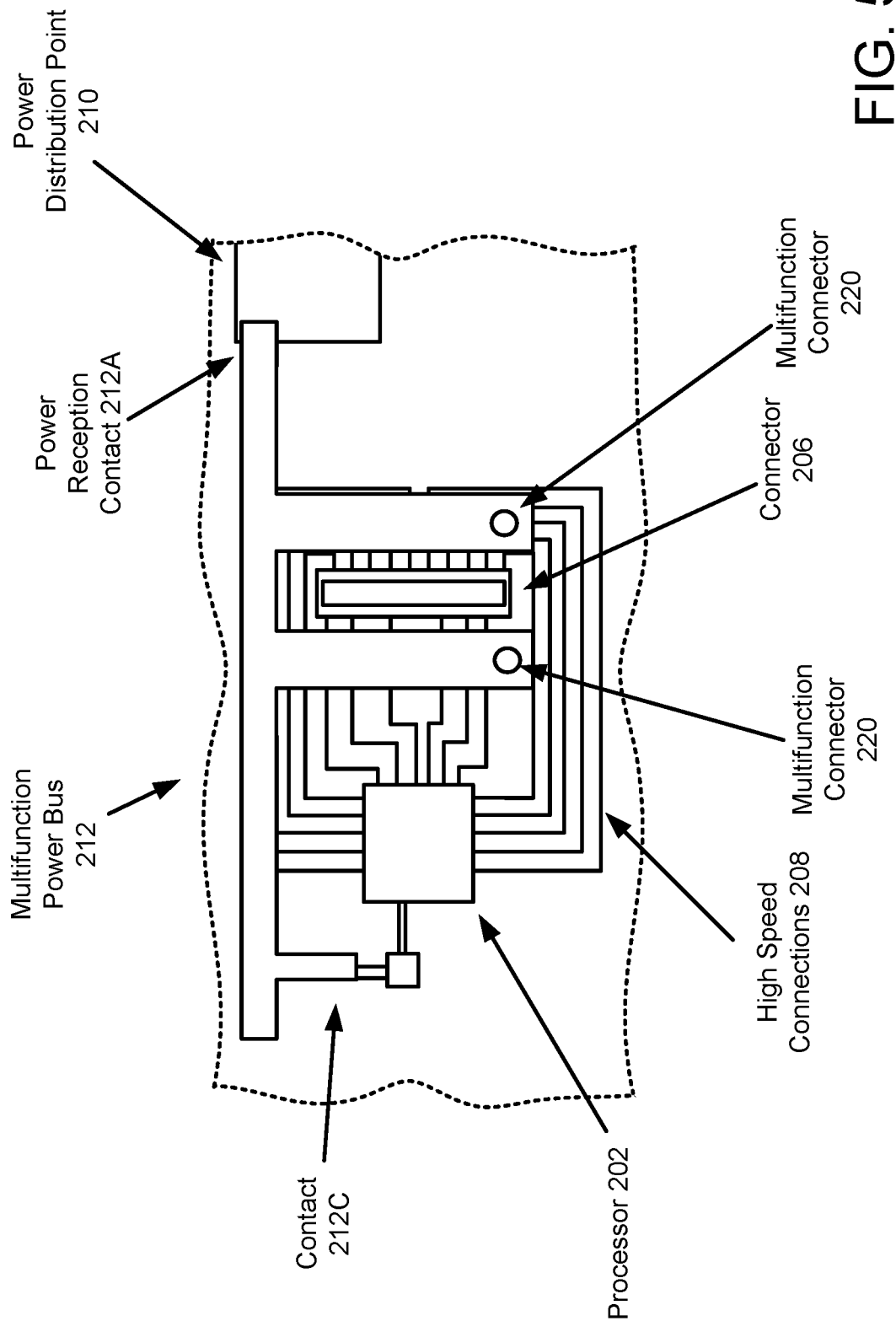
FIG. 5B shows a diagram illustrating a first top view of a portion of a motherboard and a multifunction power bus of a data processing system in accordance with an embodiment.
Figure 5C:
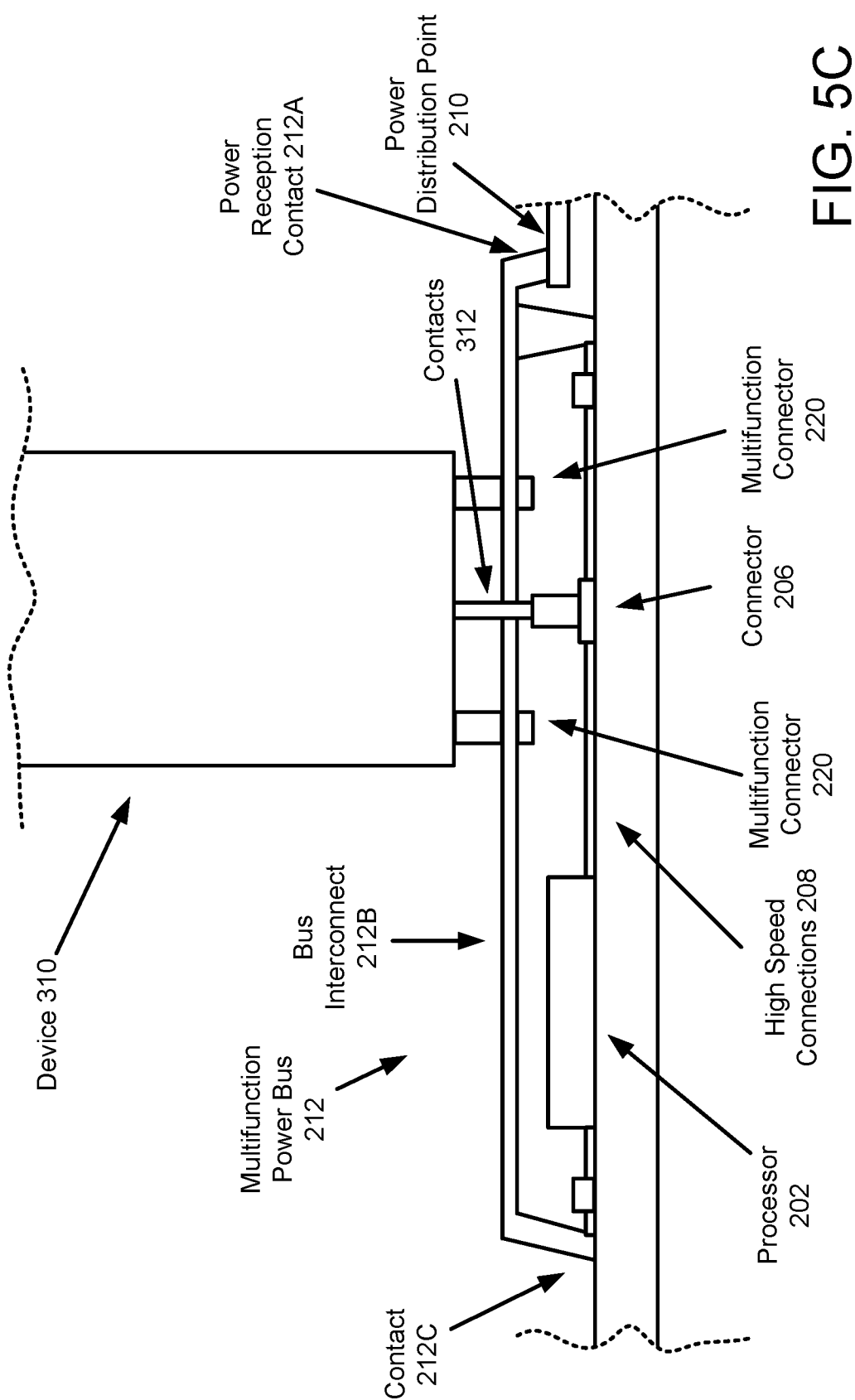
FIG. 5C shows a diagram illustrating a first top side of a portion of a motherboard and a multifunction power bus of a data processing system in accordance with an embodiment.

To provide for power distribution and mechanical stabilization, a multifunction power bus may be utilized. Turning to FIGS. 5B-5C, a top view diagram and a side view diagram, respectively, of a multifunction power bus 212 in accordance with an embodiment is shown. As seen in these figures, the multifunction power bus may (i) have a shape/topology so that it may be positioned proximate to both the power ingest location and device attachment area and (ii) include one or more of multifunction connector 220 which may facilitate mechanical attachment of a device connected to connector 206 and/or power distribution to the device.

For example, multifunction connector 220 may be implemented with a structure that facilitates attachment of device to it. When so attached, the mechanical load from device 310 may be dissipated (e.g., via transmission of the mechanical load through multifunction power bus 212 to the motherboard). For example, multifunction connector 220 may be implemented with a bolt, pin, and/or other structure that allow for mechanical attachment of device 310 to it.

Multifunction connector 220 may also facilitate distribution of power directly to device 310. For example, multifunction connector 220 may include one or more conductive components that allow for current to flow into and/or out of device 310 via multifunction power bus 212. In this manner, multifunction power bus 212 may distribution power to various portions of a motherboard and/or to various devices connected to connectors (e.g., 206) of the motherboard. By doing so, the motherboard may not need to include features for distributing power to connected devices thereby further reducing the competition for motherboard area.

Figure 5D:
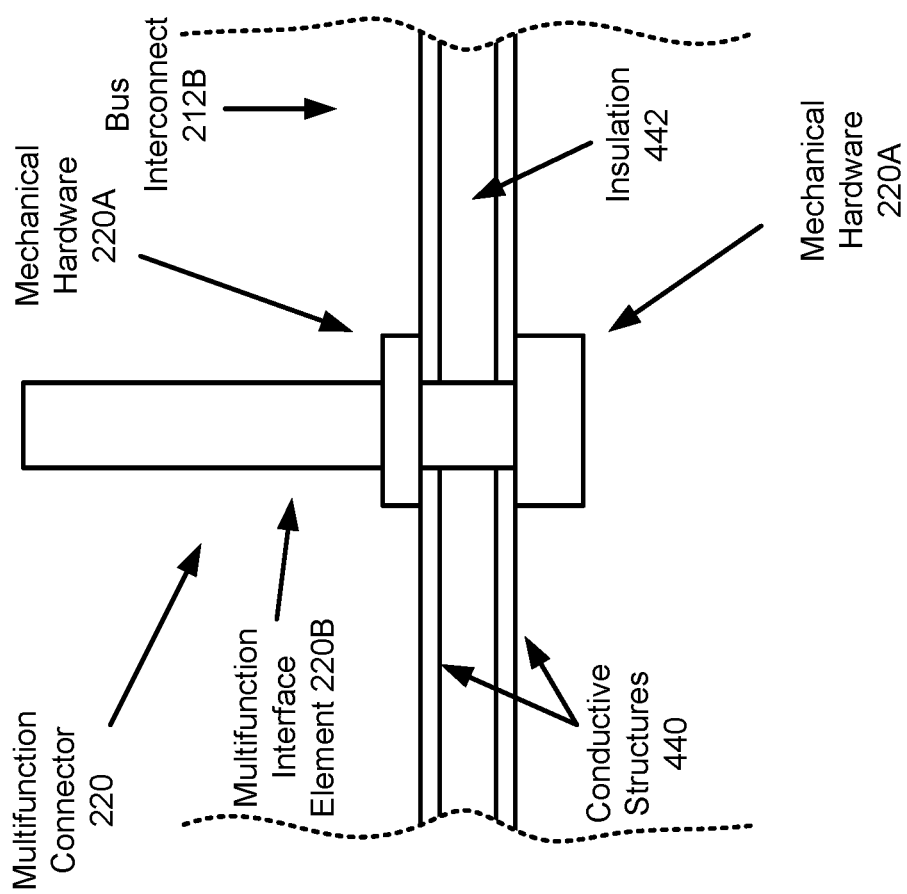
FIG. 5D shows a diagram illustrating a first side view of a portion of a multifunction power bus and multifunction connector of a data processing system in accordance with an embodiment.

Turning to FIG. 5D, a side view diagram of multifunction connector 220 and bus interconnect 212B in accordance with an embodiment is shown. The multifunction connection may provide for mechanical connection and/or electrical connection of devices to bus interconnect 212B, depending on how multifunction connector 220 is implemented.

For example, multifunction connector may include mechanical hardware 220A that locks multifunction connector 220 to a portion of bus interconnect 212B (e.g., which may include a hole or other type of mounting features. A multifunction interface element 220B may be electrically connected to none, one, or multiple of conductive structures 440. While not illustrated in FIG. 5D, multifunction interface element 220B may include a corresponding number of separate electrical pathways thereby allow for current into, out of, and/or circulation through a device. In some cases, multiple multifunction connectors may be utilized to mechanically connect a device, and some of the multifunction connectors may facilitate current flow into the device while other multifunction connectors facilitate current flow out of the device.

In an embodiment, mechanical hardware 220A is implemented with dielectric materials such as Teflon or other types of dielectric materials, and are shaped to orient and/or position a device. In contrast, multifunction connector 220 may be implemented with a conductive structure (e.g., bolt, pin, etc.) to facilitate current flow. If multifunction connector is not to provide power distribution to a device, then multifunction connector 220 may not be electrically connected to conductive structures 440.

In an embodiment, a data processing device is implemented with a combination of multifunction power buses. Some of the multifunction power buses may only provide for power distribution while other multifunction power buses may provide for both power distribution and mechanical stabilization.

Figure 5E:
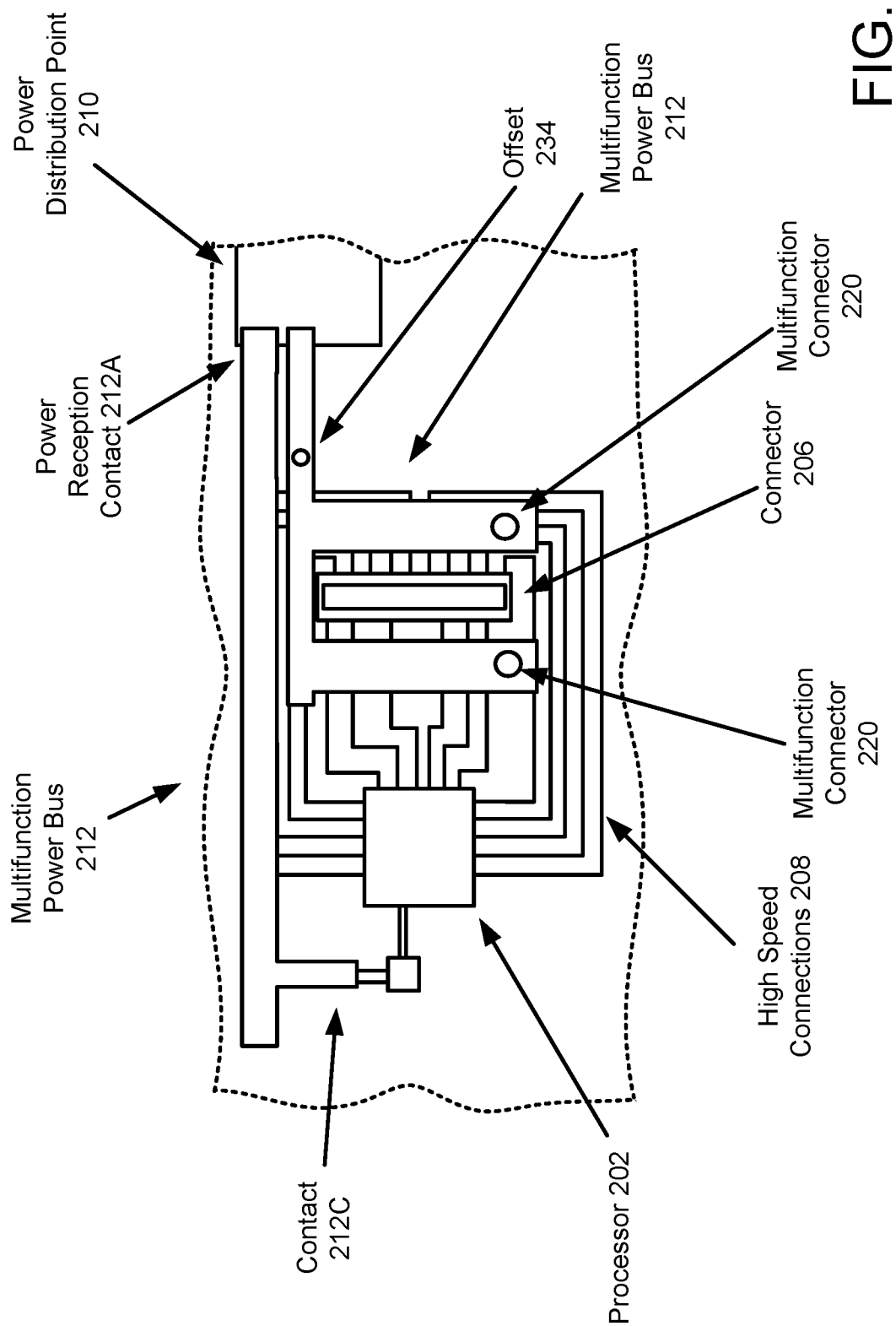
FIG. 5E shows a diagram illustrating a first top view of a portion of a motherboard and two multifunction power bus of a data processing system in accordance with an embodiment.
Figure 5F:
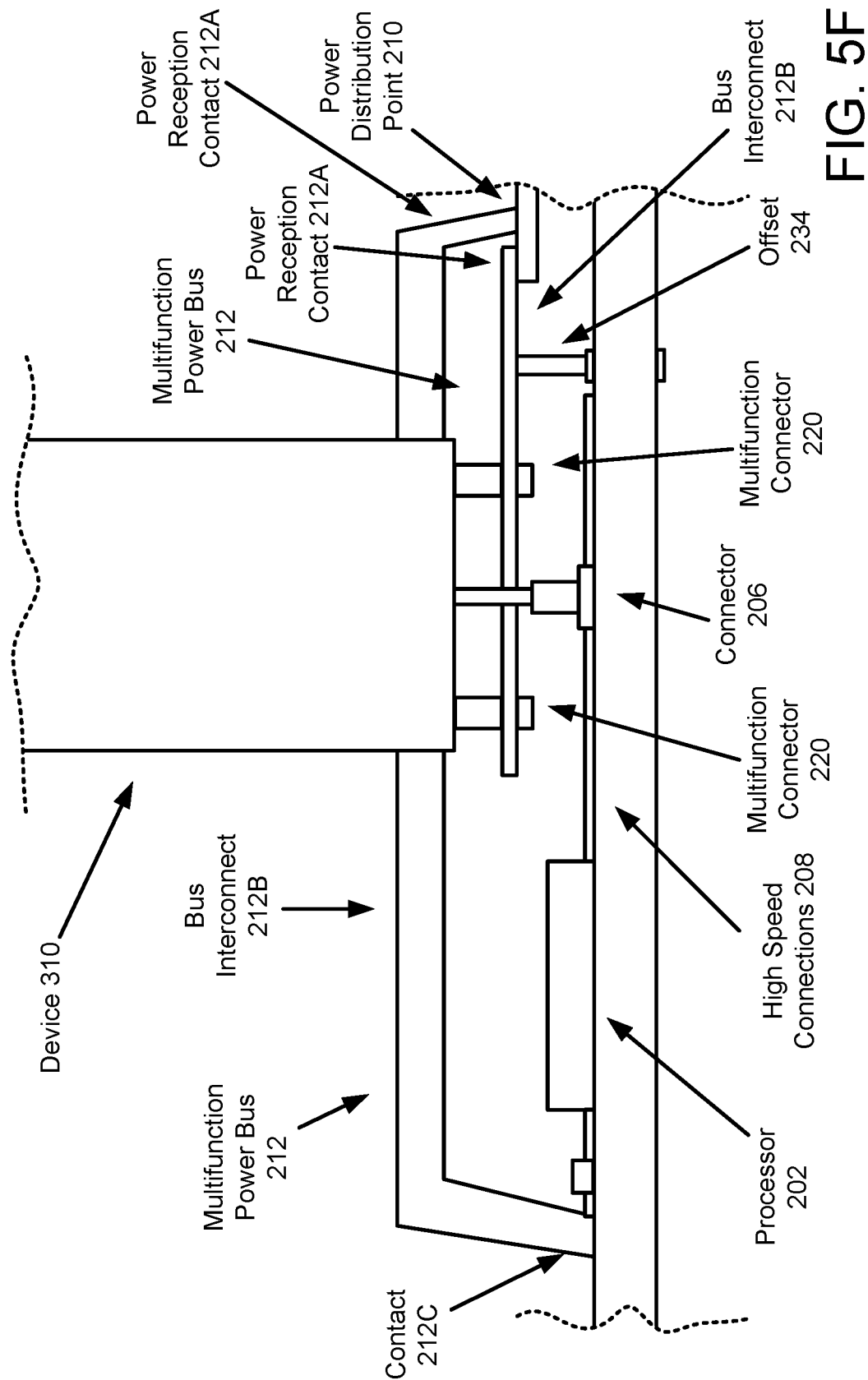
FIG. 5F shows a diagram illustrating a first side view of a portion of a motherboard and two multifunction power bus of a data processing system in accordance with an embodiment.

Turning to FIGS. 5E-5F, a top view diagram and a side view diagram of multiple multipurpose power buses in accordance with an embodiment is shown. As seen in these figures, one of the power buses (e.g., the up power bus) may only facilitate power distribution. In contrast, the other multifunction power bus may include multifunction connectors (e.g., 220) to provide for both power distribution and mechanical stabilization of device 310. When providing mechanical stabilization, a multifunction power bus may be connected to the motherboard via one or more of offset 234 (which may provide for mechanical attachment and/or electrical isolation).

Like adapter plates, a broad array of multifunction power buses may be obtained to provide for compatibility with a broad array of devices that may have varying mechanical stabilization requirements. For example, in FIGS. 5E-5F, device 310 may require multiple attachments to appropriately dissipate mechanical loads that may otherwise degrade device 310. However, different multifunction power buses may provide for compatibility with other devices.

Figure 5G:
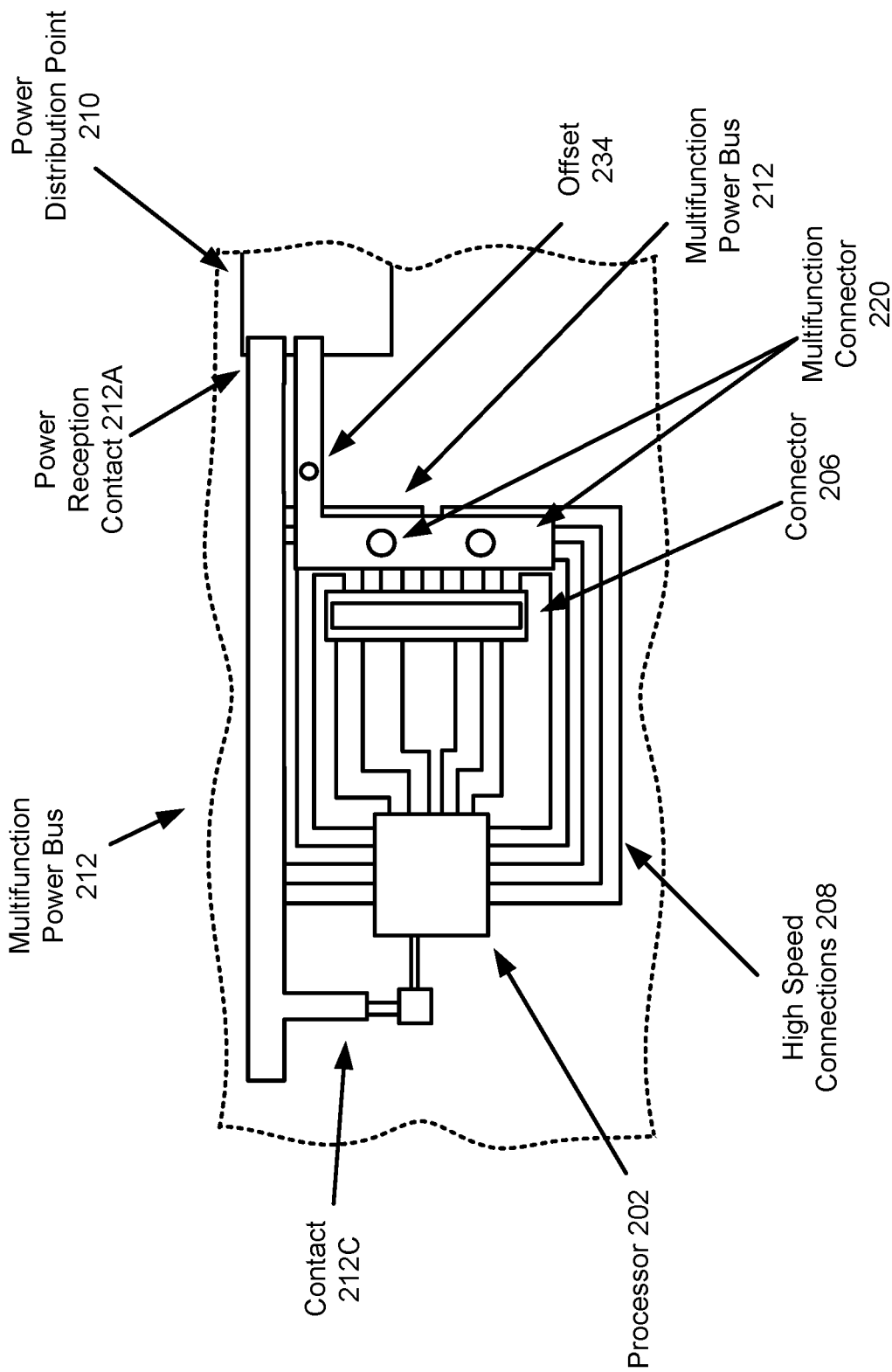
FIG. 5G shows a diagram illustrating a second top view of a portion of a motherboard and two multifunction power bus of a data processing system in accordance with an embodiment.
Figure 5H:
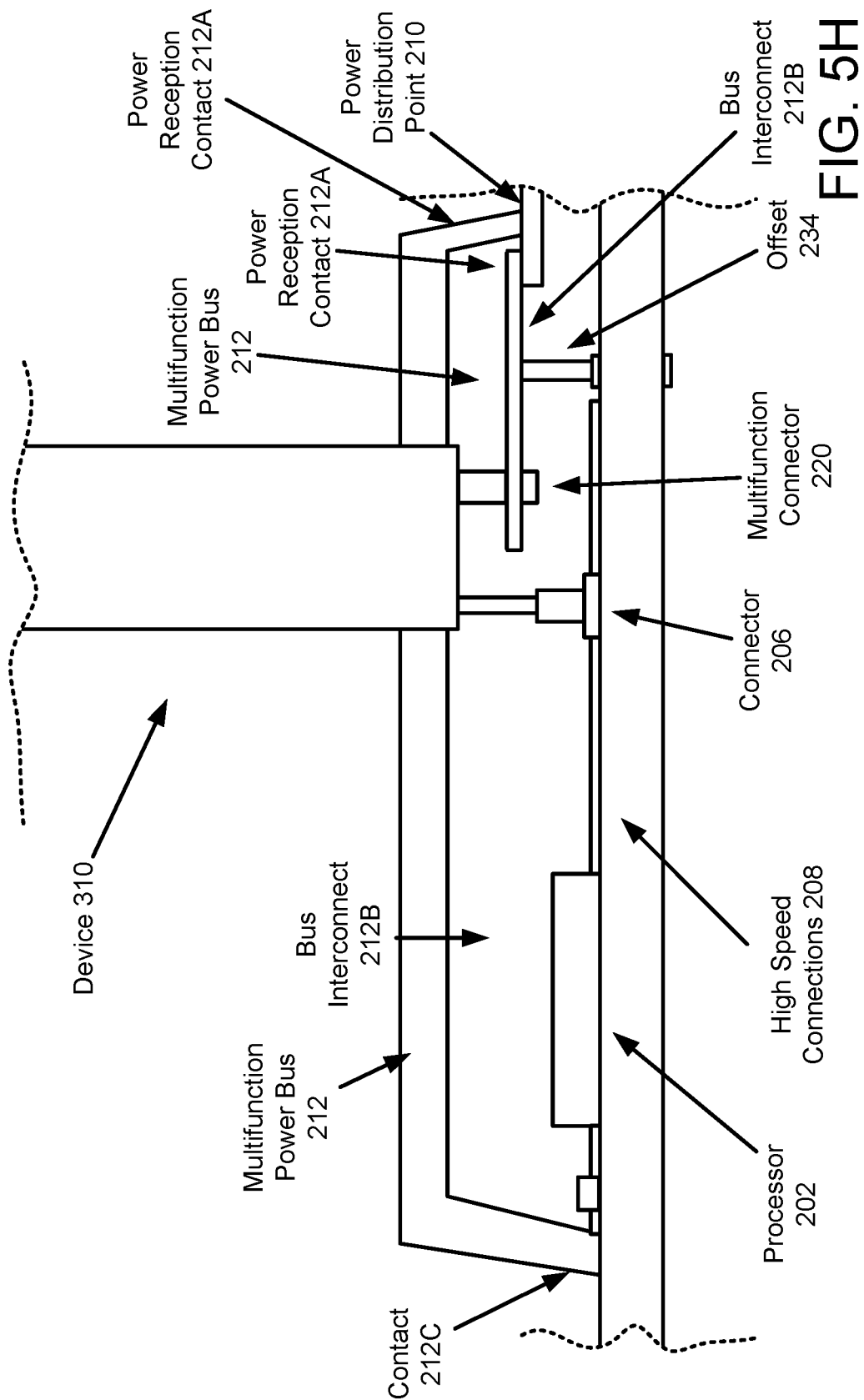
FIG. 5H shows a diagram illustrating a second side view of a portion of a motherboard and two multifunction power bus of a data processing system in accordance with an embodiment.
Figure 6:
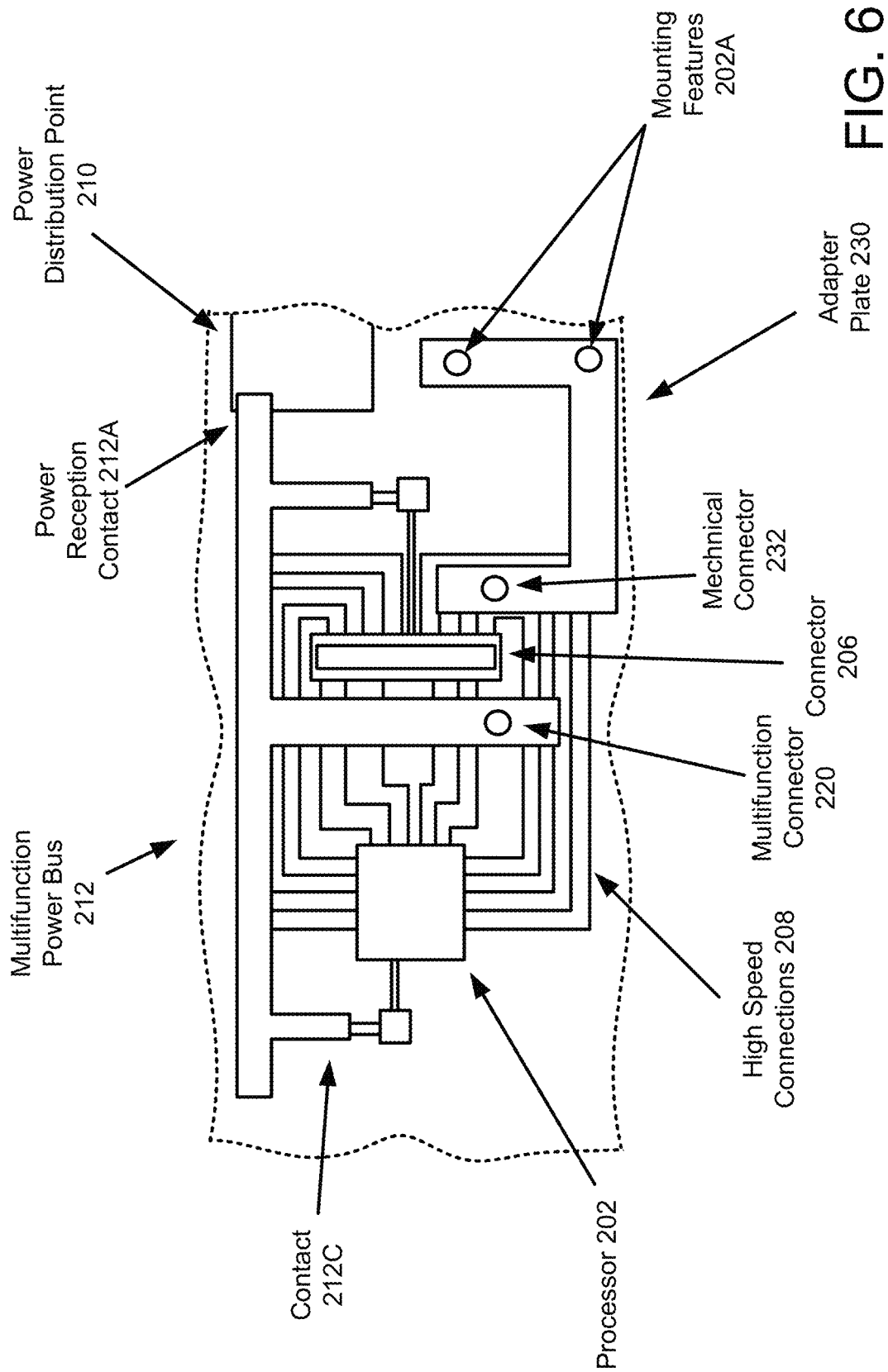
FIG. 6 shows a diagram illustrating a top view of a portion of a motherboard, an adapter plate, and a multifunction power bus of a data processing system in accordance with an embodiment.

Turning to FIGS. 5G-5H, a top view diagram and a side view diagram of multiple multipurpose power buses in accordance with an embodiment is shown. In contrast to FIGS. 5E-5F, the multifunction power that provides both power distribution and mechanical stabilization services to device 310 has a different shape and includes fewer multifunction connectors to provide for compatibility with device 310 also having less mechanical mounting hardware.

While illustrated in FIGS. 3A-3H as being used separately, a data processing system may include any combination of adapter plates and multifunction power buses. For example, turning to FIG. 6, a top view diagram of a motherboard in accordance with an embodiment is shown. To abstract both power distribution and mechanical stabilization, multifunction power bus 212 and adapter plate 230 may be utilized. Adapter plate 230 may facilitate partial connection of a device which connects to connector 206 to the motherboard. Multifunction power bus 212 may also (i) facilitate partial connection of the device to the mother and (ii) distribution of power to both various locations on the motherboard and to the device. In this manner, both power distribution and mechanical stabilization may be provided by structures other than the motherboard.

Further, this approach may provide for a broad array of compatibility of motherboards with various devices.

Figure 7:
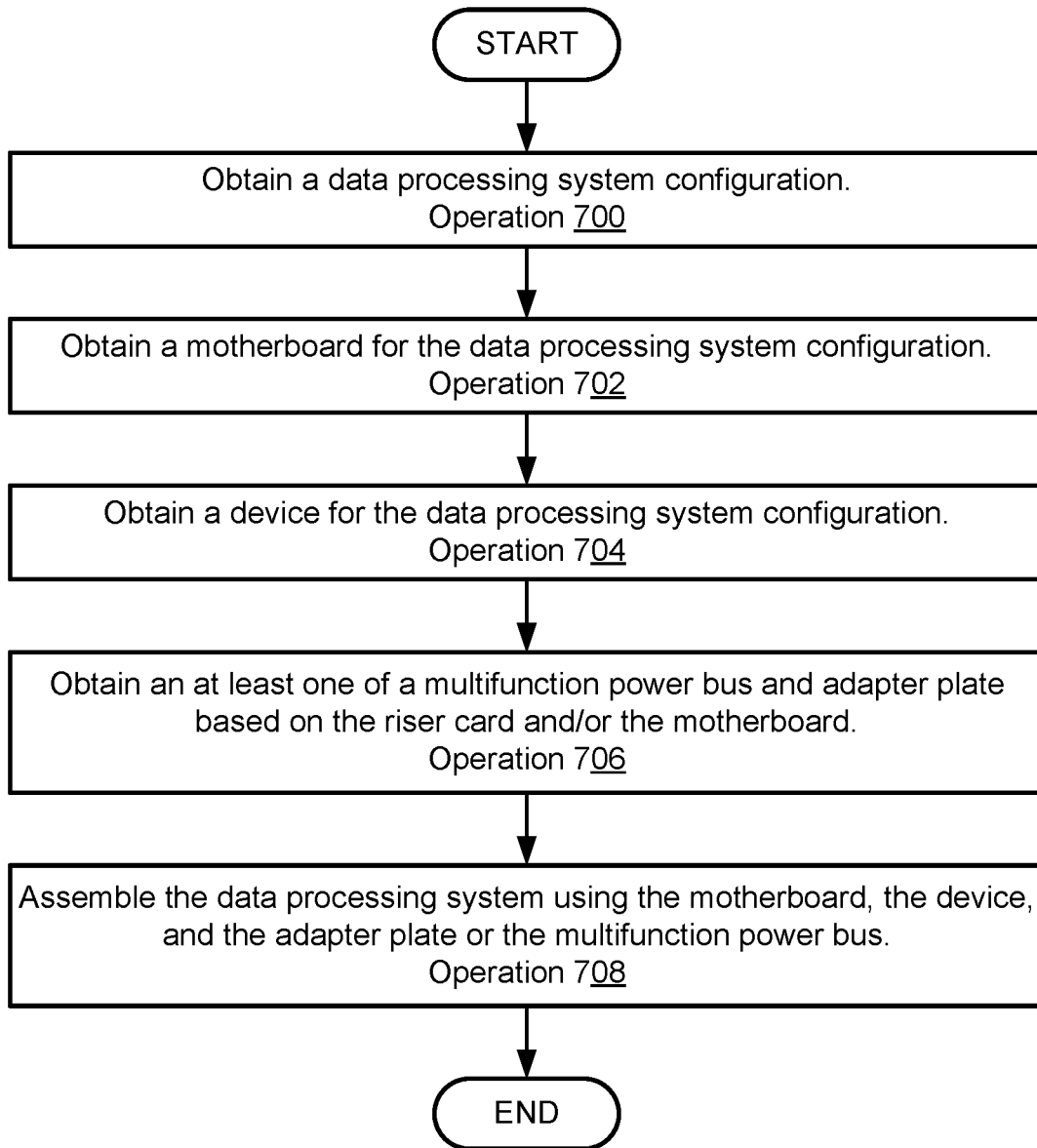
FIG. 7 shows a flow diagram illustrating a method of a data processing system in accordance with an embodiment.

Turning to FIG. 7, a flow diagram illustrating a method of obtaining a data processing system in accordance with an embodiment is shown. While illustrated with various operations, any of the operations may be omitted, performed repeatedly, performed in other orders, and/or may be performed in a parallel and/or partially overlapping in time manner without departing from embodiments disclosed herein.

Prior to operation 700, motherboards with standardized mounting features may be obtained (e.g., via manufacturing). Likewise, adapter plates and multifunction power buses of varying geometries as illustrated in FIGS. 3A-6 may be obtained (e.g., via manufacturing). The adapter plates and multifunction power buses may all be compatible with all of the motherboards, but may be specialized (i) for use with various devices that may connect to the motherboards and/or (ii) to meet various power distribution needs.

At operation 700, a data processing configuration is obtained. The configuration may be obtained by matching requirements for a data processing system to a motherboard and various devices which may connect to the motherboard. The match may be performed using one or more lookup tables that indicate components based on data processing system requirements. The data processing configuration may be obtained via other methods (e.g., received from a customer) without departing from embodiments disclosed herein.

At operation 702, a motherboard for the data processing system configuration is obtained. The motherboard may be obtained from the previously obtained motherboards. The motherboard may be compatible with the various adapter plates and multifunction power buses.

At operation 704, a device for the data processing system configuration is obtained. The device may have power and/or mechanical stability requirements. The device may be, for example, a riser card or other device that may be attached to the motherboard to provide the data processing system with additional resources for providing computer implemented services.

At operation 706, at least one of a multifunction power bus and adapter plate are obtained based on the device and/or the motherboard. The multifunction power bus or adapter plate may be obtained by matching the device and/or motherboard to the multifunction power bus and adapter plate. The match may be performed using one or more lookup tables that indicate the multifunction power bus or adapter plate based on the device and/or motherboard (e.g., the lookup table may associate the device and/or motherboard with these components for compatibility purposes). The multifunction power bus or adapter plate may be obtained via other methods without departing from embodiments disclosed herein.

Operations 704-706 may be repeated any number of times to identify any number of devices, adapter plates, and multifunction power buses.

At operation 708, the data processing system is assembled using the motherboard, the device, and the adapter plate or multifunction power bus. Any number of such components may be assembled to obtain the data processing system.

The method may end following operation 708.

Using the method illustrated in FIG. 7, data processing systems may be assembled quickly and/or at lower cost through standardization of motherboards that may be adapted using multifunction power buses and/or adapter plates.

Figure 8:
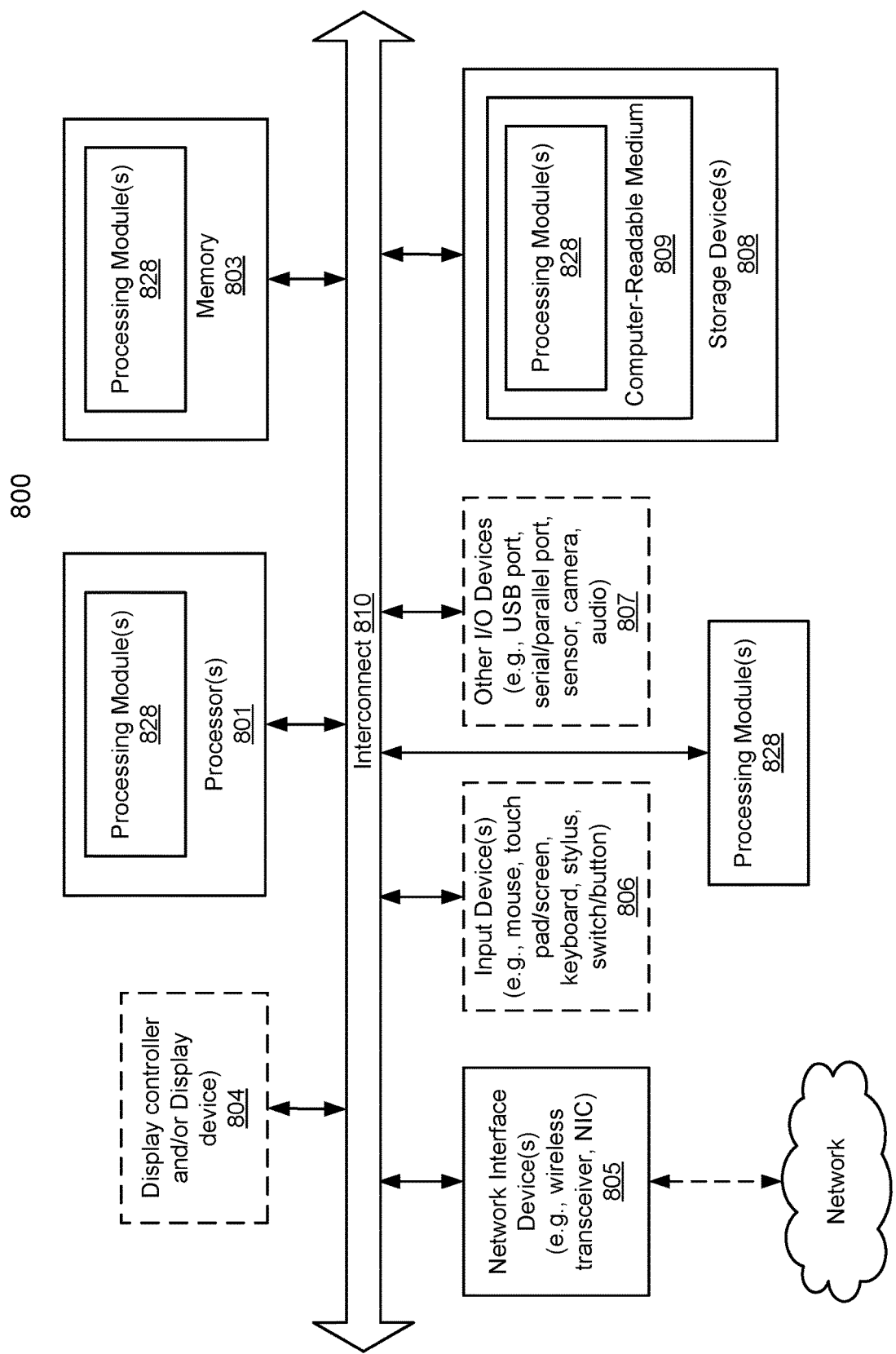
FIG. 8 is a block diagram illustrating a data processing system in accordance with an embodiment.

Any of the components illustrated in FIGS. 1-7 may be implemented with one or more computing devices. Turning to FIG. 8, a block diagram illustrating an example of a data processing system (e.g., a computing device) in accordance with an embodiment is shown. For example, system 800 may represent any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 800 may further include 10 devices such as devices (e.g., 805, 806, 807, 808) including network interface device(s) 805, optional input device(s) 806, and other optional 10 device(s) 807. Network interface device(s) 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with a display device of optional graphics subsystem 804), a pointer device such as a stylus, and/or a keyboard (e.g., physical keyboard or a virtual keyboard displayed as part of a touch sensitive screen). For example, input device(s) 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-readable storage medium 809 (also known as a machine-readable storage medium or a computer-readable medium) on which is stored one or more sets of instructions or software (e.g., processing module, unit, and/or processing module/unit/logic 828) embodying any one or more of the methodologies or functions described herein. Processing module/unit/logic 828 may represent any of the components described above. Processing module/unit/logic 828 may also reside, completely or at least partially, within memory 803 and/or within processor 801 during execution thereof by system 800, memory 803 and processor 801 also constituting machine-accessible storage media. Processing module/unit/logic 828 may further be transmitted or received over a network via network interface device(s) 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 828, components and other features described herein can be implemented as discrete hardware components or integrated in the functionality of hardware components such as ASICS, FPGAs, DSPs or similar devices. In addition, processing module/unit/logic 828 can be implemented as firmware or functional circuitry within hardware devices. Further, processing module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system to provide computer implemented services, the data processing system comprising:
   a motherboard, comprising:
      device locations where devices may be operably connected to the motherboard, and
      data interconnects between the device locations that facilitate operable data connection formation between devices in the device locations, and
      attachment points positioned away from the data interconnects;

a device of the devices positioned at one of the device locations, the device requiring mechanical support;

an adapter plate comprising:

a first attachment point attached to one of the attachment points of the motherboard via an offset to distance and orient the adapter plate with respect to the motherboard, the adapter plate being suspended over a surface of the motherboard via the offset without any part of the adapter plate being in direct contact with an electrical receptacle of the motherboard, a second attachment point attached to the device of the devices to provide the required mechanical support.

2. The data processing system of claim 1, the second attachment point is positioned above a portion of the data interconnects.

3. The data processing system of claim 2, wherein the device comprises:

an electrical connector directly connected to the electrical receptacle of the motherboard in the one of the device locations, the direct connection forming an operable connection between the device and a second device of the devices, the second device being positioned at a second location of the device locations, and the operable connection being supported by the data interconnects.

4. The data processing system of claim 3, wherein the adapter plate is suspended over the surface of the motherboard without covering any part of the electrical connector.

5. The data processing system of claim 1, further comprising:

a second adapter plate, comprising:

a third attachment point adapted for attachment to the one of the attachment points via the offset to distance and orient the second adapter plate with respect to the motherboard; and a fourth attachment point adapted for attachment to a second device of the devices, the fourth attachment point having a different first relative placement with respect to the third attachment point than when compared to a second relative placement between the second attachment point and the first attachment point.

6. The data processing system of claim 5, wherein the second relative placement is based, at least in part, on a location of a connection point of the device to which the adapter plate is connected.

7. The data processing system of claim 6, wherein the first relative placement is based, at least in part, on a location of a connection point of the second device to which the fourth attachment point is adapted to be connected.

8. The data processing system of claim 1, wherein the device comprises a riser card.

9. The data processing system of claim 1, wherein the adapter plate is adapted to displace forces applied onto the motherboard as a result of a weight of the device bearing down on the motherboard to a portion of the motherboard at which the attachment points are positioned.

10. The data processing system of claim 1, wherein the offset is a mechanical structure that is separate from a structure of the adapter plate, the offset connecting the adapter plate to the motherboard.

11. The data processing system of claim 10, wherein multiple ones of the offset are connected to the adapter plate.

12. The data processing system of claim 10, wherein no part of the device that is attached to the adapter plate is in direct connect with the adapter plate, the device being connected to the adapter plate by a connector attached between the device and the second attachment point of the adapter plate.

13. The data processing system of claim 12, wherein the adaptor plate is a mechanical structure without any electrical connections that electrically couple the adaptor plate to either the motherboard or the device.

14. A motherboard of a data processing system comprising:

a device location for installing a device onto the motherboard;

data interconnects;

attachment points positioned away from the device location and the data interconnects, wherein the device is positioned at the device location and device requires mechanical support to be installed onto the motherboard; and an adapter plate comprising:

a first attachment point attached to the attachment points of the motherboard via an offset to distance and orient the adapter plate with respect to the motherboard, the adapter plate being suspended over a surface of the motherboard via the offset without any part of the adapter plate being in direct contact with an electrical receptacle of the motherboard, a second attachment point attached to the device to provide the required mechanical support.

15. The motherboard of claim 14, wherein the second attachment point is positioned over a portion of the data interconnects of the motherboard.

16. The motherboard of claim 14, wherein the adapter plate is electrically grounded to the first-motherboard.

17. The motherboard of claim 14, wherein the device location comprises an electrical connector to which the device is connected in addition to being connected to the adapter plate, and the device being connected to a processor positioned with the motherboard via the electrical connector.

18. The motherboard of claim 17, wherein the electrical connector by itself is unable to support a weight of the first device without the required mechanical support provided by the adapter plate.

19. The motherboard of claim 14, wherein the offset is a mechanical structure that is separate from a structure of the adapter plate, the offset connecting the adapter plate to the motherboard.

20. The motherboard of claim 19, wherein multiple ones of the offset are connected to the adapter plate.

* * * * *

UNITED STATES PATENT AND TRADEMARK OFFICE
CERTIFICATE OF CORRECTION

PATENT NO. : 12,235,690 B2
APPLICATION NO. : 17/721141
DATED : February 25, 2025
INVENTOR(S) : Corey Dean Hartman and Sanjiv Sinha Page 1 of 1

It is certified that error appears in the above-identified patent and that said Letters Patent is hereby corrected as shown below:

In the Claims

Claim 16, Column 24, Line 42, the words "the first-motherboard" should read -- the motherboard --.

Signed and Sealed this
First Day of April, 2025

Coke Morgan Stewart
*Acting Director of the United States Patent and Trademark Office*